United States Patent
Pervan et al.

(10) Patent No.: US 11,313,123 B2
(45) Date of Patent: Apr. 26, 2022

(54) METHOD OF FORMING A BUILDING PANEL OR SURFACE ELEMENT AND SUCH A BUILDING PANEL AND SURFACE ELEMENT

(71) Applicant: Valinge Innovation AB, Viken (SE)

(72) Inventors: Darko Pervan, Viken (SE); Peter Wingårdh, Viken (SE); Göran Ziegler, Viken (SE); Thomas Meijer, Viken (SE)

(73) Assignee: VALINGE INNOVATION AB, Viken (SE)

( * ) Notice: Subject to any disclaimer, the term of this patent is extended or adjusted under 35 U.S.C. 154(b) by 308 days.

(21) Appl. No.: 15/183,424

(22) Filed: Jun. 15, 2016

(65) Prior Publication Data

US 2016/0369507 A1    Dec. 22, 2016

(30) Foreign Application Priority Data

Jun. 16, 2015    (SE) .................................... 1550827-8

(51) Int. Cl.
*E04C 2/26* (2006.01)
*B32B 21/04* (2006.01)
(Continued)

(52) U.S. Cl.
CPC .................. *E04C 2/26* (2013.01); *B32B 5/02* (2013.01); *B32B 5/028* (2013.01); *B32B 13/02* (2013.01); *B32B 13/06* (2013.01); *B32B 13/12* (2013.01); *B32B 13/14* (2013.01); *B32B 15/02* (2013.01); *B32B 15/08* (2013.01); *B32B 21/04* (2013.01); *B32B 27/06* (2013.01); *B32B 27/12* (2013.01); *B32B 27/20* (2013.01); *B32B 33/00* (2013.01); *B32B 38/08* (2013.01); *B32B 37/06* (2013.01); *B32B 37/10* (2013.01);
(Continued)

(58) Field of Classification Search
None
See application file for complete search history.

(56) References Cited

U.S. PATENT DOCUMENTS 2,018,712 A    10/1935 Elmendorf
2,419,614 A     4/1947 Welch
(Continued)

FOREIGN PATENT DOCUMENTS

AU        80284/75      6/1975
AU    2011236087 A1    10/2011
(Continued)

OTHER PUBLICATIONS

Lstiburek, Joseph, Understanding Vapor Barriers, Apr. 15, 2011, Building Science Corporation, BSD-106, 1-18 (Year: 2011).*
(Continued)

*Primary Examiner* — Monica A Huson
*Assistant Examiner* — Kelsey C Grace
(74) *Attorney, Agent, or Firm* — Buchanan Ingersoll & Rooney P.C.

(57) ABSTRACT

A method of forming a building panel or a surface element, including providing a substrate, applying a sub-layer on the substrate, applying a mesh structure on the sub-layer, and applying heat and pressure to the mesh structure such that the sub-layer at least partially fills meshes of the mesh structure. Also, to such a building panel and a surface element.

26 Claims, 5 Drawing Sheets

(51) Int. Cl.
  *B32B 5/02*    (2006.01)
  *B32B 33/00*   (2006.01)
  *B32B 38/08*   (2006.01)
  *B32B 13/06*   (2006.01)
  *B32B 13/14*   (2006.01)
  *B32B 13/12*   (2006.01)
  *B32B 27/06*   (2006.01)
  *B32B 15/02*   (2006.01)
  *B32B 15/08*   (2006.01)
  *B32B 13/02*   (2006.01)
  *B32B 27/12*   (2006.01)
  *B32B 27/20*   (2006.01)
  *B32B 37/06*   (2006.01)
  *B32B 37/10*   (2006.01)
  *B32B 37/24*   (2006.01)
  *E04F 15/10*   (2006.01)

(52) U.S. Cl.
  CPC ......... *B32B 37/1027* (2013.01); *B32B 37/24* (2013.01); *B32B 2260/021* (2013.01); *B32B 2260/026* (2013.01); *B32B 2260/046* (2013.01); *B32B 2262/02* (2013.01); *B32B 2262/062* (2013.01); *B32B 2262/067* (2013.01); *B32B 2305/38* (2013.01); *B32B 2307/538* (2013.01); *B32B 2307/554* (2013.01); *B32B 2307/724* (2013.01); *B32B 2311/00* (2013.01); *B32B 2375/00* (2013.01); *B32B 2419/04* (2013.01); *B32B 2607/00* (2013.01); *E04F 15/102* (2013.01); *E04F 15/107* (2013.01)

(56) References Cited

U.S. PATENT DOCUMENTS

| | | |
|---|---|---|
| 2,587,064 A | 2/1952 | Rapson |
| 2,630,395 A | 3/1953 | McCullough |
| 2,634,534 A | 4/1953 | Brown |
| 2,695,857 A | 11/1954 | Lewis et al. |
| 2,720,478 A | 10/1955 | Hogg |
| 2,831,793 A | 4/1958 | Elmendorf |
| 2,831,794 A | 4/1958 | Elmendorf |
| 2,932,596 A | 4/1960 | Rayner |
| 2,962,081 A | 11/1960 | Dobry et al. |
| 2,992,152 A | 7/1961 | Chapman |
| 3,032,820 A | 5/1962 | Johnson |
| 3,135,643 A | 6/1964 | Michl |
| 3,286,006 A | 11/1966 | Annand |
| 3,308,013 A | 3/1967 | Bryant |
| 3,325,302 A | 6/1967 | Hosfeld |
| 3,342,621 A | 9/1967 | Point et al. |
| 3,345,234 A | 10/1967 | Jecker et al. |
| 3,392,082 A | 7/1968 | Lloyd |
| 3,426,730 A | 2/1969 | Lawson et al. |
| 3,463,653 A | 8/1969 | Letter |
| 3,486,484 A | 12/1969 | Bullough |
| 3,533,725 A | 10/1970 | Bridgeford |
| 3,540,978 A | 11/1970 | Ames |
| 3,565,665 A | 2/1971 | Stranch et al. |
| 3,578,522 A | 5/1971 | Rauch |
| 3,615,279 A | 10/1971 | Ward, Jr. |
| 3,673,020 A | 6/1972 | De Jaeger |
| 3,729,368 A | 4/1973 | Ingham |
| 3,844,863 A | 10/1974 | Forsythe |
| 3,846,219 A | 11/1974 | Kunz |
| 3,880,687 A | 4/1975 | Elmendorf et al. |
| 3,895,984 A | 7/1975 | Cone et al. |
| 3,897,185 A | 7/1975 | Beyer |
| 3,897,588 A | 7/1975 | Nohtomi |
| 3,914,359 A | 10/1975 | Bevan |
| 3,950,599 A * | 4/1976 | Board, Jr. ............ F16C 33/201 442/40 |
| 3,956,542 A | 5/1976 | Roberti |
| 3,961,108 A | 6/1976 | Rosner et al. |
| 4,052,739 A | 10/1977 | Wada et al. |
| 4,093,766 A | 6/1978 | Scher et al. |
| 4,115,178 A | 9/1978 | Cone et al. |
| 4,126,725 A | 11/1978 | Shiflet |
| 4,131,705 A | 12/1978 | Kubinsky |
| 4,263,373 A | 4/1981 | McCaskey, Jr. et al. |
| 4,277,527 A | 7/1981 | Duhl |
| 4,311,621 A | 1/1982 | Nishizawa et al. |
| 4,313,857 A | 2/1982 | Blount |
| 4,337,290 A | 6/1982 | Kelly et al. |
| 4,361,612 A | 11/1982 | Shaner |
| 4,420,351 A | 12/1983 | Lussi |
| 4,420,525 A | 12/1983 | Parks |
| 4,430,375 A | 2/1984 | Scher et al. |
| 4,430,380 A * | 2/1984 | Honel .................... C08G 12/32 427/372.2 |
| 4,474,920 A | 10/1984 | Kyminas et al. |
| 4,743,484 A * | 5/1988 | Robbins .................. B27D 1/04 428/106 |
| 4,863,777 A | 9/1989 | Callaway et al. |
| 4,872,825 A * | 10/1989 | Ross ...................... B29C 43/18 425/117 |
| 4,890,656 A | 1/1990 | Ohsumi et al. |
| 4,911,969 A | 3/1990 | Ogata et al. |
| 4,942,084 A | 7/1990 | Prince |
| 5,034,272 A | 7/1991 | Lindgren et al. |
| 5,059,472 A | 10/1991 | LeBell et al. |
| 5,085,930 A | 2/1992 | Widmann |
| 5,147,486 A | 9/1992 | Hoffman |
| 5,206,066 A | 4/1993 | Horacek |
| 5,246,765 A | 9/1993 | Lussi et al. |
| 5,258,216 A | 11/1993 | Von Bonin et al. |
| 5,292,576 A | 3/1994 | Sanders |
| 5,314,554 A | 5/1994 | Owens |
| 5,354,259 A * | 10/1994 | Scholz .................... A61L 15/12 427/180 |
| 5,405,705 A | 4/1995 | Fujimoto |
| 5,422,170 A | 6/1995 | Iwata et al. |
| 5,447,752 A | 9/1995 | Cobb |
| 5,466,511 A | 11/1995 | O'Dell et al. |
| 5,543,193 A | 8/1996 | Tesch |
| 5,569,424 A | 10/1996 | Amour |
| 5,601,930 A | 2/1997 | Mehta et al. |
| 5,604,025 A | 2/1997 | Tesch |
| 5,609,966 A | 3/1997 | Perrin et al. |
| 5,755,068 A | 5/1998 | Ormiston |
| 5,766,522 A | 6/1998 | Daly |
| 5,827,788 A | 10/1998 | Miyakoshi |
| 5,855,832 A | 1/1999 | Clausi |
| 5,891,564 A | 4/1999 | Schultz et al. |
| 5,925,211 A | 7/1999 | Rakauskas |
| 5,925,296 A | 7/1999 | Leese |
| 5,942,072 A | 8/1999 | McKinnon |
| 5,976,689 A | 11/1999 | Witt et al. |
| 5,985,397 A | 11/1999 | Witt et al. |
| 6,036,137 A | 3/2000 | Myren |
| 6,089,297 A | 7/2000 | Shibagaki et al. |
| 6,103,377 A | 8/2000 | Clausi |
| 6,238,750 B1 | 5/2001 | Correll et al. |
| 6,291,625 B1 | 9/2001 | Hosgood |
| 6,468,645 B1 | 10/2002 | Clausi |
| 6,481,476 B1 | 11/2002 | Okamoto |
| 6,521,326 B1 | 2/2003 | Fischer et al. |
| 6,528,437 B1 | 3/2003 | Hepfinger et al. |
| 6,537,610 B1 | 3/2003 | Springer et al. |
| 6,620,349 B1 | 9/2003 | Lopez |
| 6,667,108 B2 | 12/2003 | Ellstrom |
| 6,769,217 B2 | 8/2004 | Nelson |
| 6,773,799 B1 | 8/2004 | Persson et al. |
| 6,803,110 B2 | 10/2004 | Drees et al. |
| 6,926,954 B2 | 8/2005 | Shuren et al. |
| 6,991,830 B1 | 1/2006 | Hansson et al. |
| 7,022,756 B2 | 4/2006 | Singer |
| 7,485,693 B2 | 2/2009 | Matsuda et al. |
| 7,568,322 B2 | 8/2009 | Pervan |
| 7,678,425 B2 | 3/2010 | Oldorff |
| 7,811,489 B2 | 10/2010 | Pervan |

(56) References Cited

U.S. PATENT DOCUMENTS

| | | |
|---|---|---|
| 7,918,062 B2 | 4/2011 | Chen |
| 8,021,741 B2 | 9/2011 | Chen |
| 8,206,534 B2 | 6/2012 | McDuff et al. |
| 8,245,477 B2 | 8/2012 | Pervan |
| 8,302,367 B2 | 11/2012 | Schulte |
| 8,349,234 B2 | 1/2013 | Ziegler et al. |
| 8,349,235 B2 | 1/2013 | Pervan et al. |
| 8,407,963 B2 | 4/2013 | Schulte |
| 8,419,877 B2 | 4/2013 | Pervan et al. |
| 8,431,054 B2 | 4/2013 | Pervan et al. |
| 8,480,841 B2 | 7/2013 | Pervan et al. |
| 8,481,111 B2 | 7/2013 | Ziegler et al. |
| 8,499,520 B2 | 8/2013 | Schulte |
| 8,617,439 B2 | 12/2013 | Pervan et al. |
| 8,635,829 B2 | 1/2014 | Schulte |
| 8,650,738 B2 | 2/2014 | Schulte |
| 8,663,785 B2 | 3/2014 | Ziegler et al. |
| 8,728,564 B2 | 5/2014 | Ziegler et al. |
| 8,752,352 B2 | 6/2014 | Schulte |
| 8,784,587 B2 | 7/2014 | Lindgren et al. |
| 8,920,874 B2 | 12/2014 | Ziegler et al. |
| 8,920,876 B2 | 12/2014 | Vetter et al. |
| 8,993,049 B2 | 3/2015 | Pervan |
| 9,085,905 B2 | 7/2015 | Persson et al. |
| 9,109,366 B2 | 8/2015 | Schulte |
| 9,181,698 B2 | 11/2015 | Pervan et al. |
| 9,255,405 B2 | 2/2016 | Pervan et al. |
| 9,296,191 B2 | 3/2016 | Pervan et al. |
| 9,352,499 B2 | 5/2016 | Ziegler et al. |
| 9,403,286 B2 | 8/2016 | Vetter et al. |
| 9,410,319 B2 | 8/2016 | Ziegler et al. |
| 9,556,622 B2 | 1/2017 | Pervan et al. |
| 9,783,996 B2 | 10/2017 | Pervan et al. |
| 10,017,950 B2 | 7/2018 | Pervan |
| 10,100,535 B2 | 10/2018 | Pervan et al. |
| 10,214,913 B2 | 2/2019 | Persson et al. |
| 10,286,633 B2 | 5/2019 | Lundblad et al. |
| 10,315,219 B2 | 6/2019 | Jacobsson |
| 10,344,379 B2 | 7/2019 | Pervan et al. |
| 10,364,578 B2 | 7/2019 | Pervan |
| 10,392,812 B2 | 8/2019 | Pervan |
| 10,442,152 B2 | 10/2019 | Schulte |
| 10,442,164 B2 | 10/2019 | Schulte |
| 10,493,729 B2 | 12/2019 | Pervan et al. |
| 10,513,094 B2 | 12/2019 | Persson et al. |
| 10,800,186 B2 | 10/2020 | Pervan et al. |
| 10,828,881 B2 | 11/2020 | Bergelin et al. |
| 10,857,765 B2 | 12/2020 | Schulte |
| 10,899,166 B2 | 1/2021 | Pervan et al. |
| 10,913,176 B2 | 2/2021 | Lindgren et al. |
| 10,926,509 B2 | 2/2021 | Schulte |
| 10,981,362 B2 | 4/2021 | Ziegler et al. |
| 10,988,941 B2 | 4/2021 | Ziegler et al. |
| 11,040,371 B2 | 6/2021 | Jacobsson |
| 11,046,063 B2 | 6/2021 | Persson et al. |
| 11,072,156 B2 | 7/2021 | Schulte |
| 11,090,972 B2 | 8/2021 | Persson et al. |
| 11,135,814 B2 | 10/2021 | Pervan et al. |
| 11,167,533 B2 | 11/2021 | Ziegler et al. |
| 11,235,565 B2 | 2/2022 | Pervan et al. |
| 2001/0006704 A1 | 7/2001 | Chen et al. |
| 2001/0009309 A1 | 7/2001 | Taguchi et al. |
| 2002/0031620 A1 | 3/2002 | Yuzawa et al. |
| 2002/0054994 A1 | 5/2002 | Dupre et al. |
| 2002/0100231 A1 | 8/2002 | Miller |
| 2002/0155297 A1 | 10/2002 | Schuren |
| 2003/0008130 A1 | 1/2003 | Kaneko |
| 2003/0056873 A1 | 3/2003 | Nakos et al. |
| 2003/0059639 A1 | 3/2003 | Worsley |
| 2003/0102094 A1 | 6/2003 | Tirri et al. |
| 2003/0108760 A1 | 6/2003 | Haas et al. |
| 2003/0208980 A1 | 11/2003 | Miller et al. |
| 2004/0035078 A1 | 2/2004 | Pervan |
| 2004/0088946 A1 | 5/2004 | Liang et al. |
| 2004/0123542 A1 | 7/2004 | Grafenauer |
| 2004/0137255 A1 | 7/2004 | Martinez et al. |
| 2004/0191547 A1 | 9/2004 | Oldorff |
| 2004/0202857 A1 | 10/2004 | Singer |
| 2004/0206036 A1 | 10/2004 | Pervan |
| 2004/0237436 A1 | 12/2004 | Zuber et al. |
| 2004/0250911 A1 | 12/2004 | Vogel |
| 2004/0255541 A1 | 12/2004 | Thiers |
| 2005/0003099 A1 | 1/2005 | Quist |
| 2005/0016107 A1 | 1/2005 | Rosenthal et al. |
| 2005/0079780 A1 | 4/2005 | Rowe et al. |
| 2005/0136234 A1 | 6/2005 | Hak et al. |
| 2005/0153150 A1 | 7/2005 | Wellwood et al. |
| 2005/0166514 A1 | 8/2005 | Pervan |
| 2005/0193677 A1 | 9/2005 | Vogel |
| 2005/0208255 A1 | 9/2005 | Pervan |
| 2005/0227040 A1 | 10/2005 | Toupalik |
| 2005/0252130 A1 | 11/2005 | Martensson |
| 2006/0008630 A1 | 1/2006 | Thiers et al. |
| 2006/0024465 A1 | 2/2006 | Briere |
| 2006/0032175 A1 | 2/2006 | Chen et al. |
| 2006/0048474 A1 | 3/2006 | Pervan et al. |
| 2006/0070321 A1 | 4/2006 | Au |
| 2006/0070325 A1 | 4/2006 | Magnusson |
| 2006/0145384 A1 | 7/2006 | Singer |
| 2006/0154015 A1 | 7/2006 | Miller et al. |
| 2006/0156672 A1 | 7/2006 | Meersseman et al. |
| 2006/0172118 A1 | 8/2006 | Han et al. |
| 2006/0182938 A1 | 8/2006 | Oldorff |
| 2006/0183853 A1 | 8/2006 | Sczepan |
| 2007/0055012 A1 | 3/2007 | Caldwell |
| 2007/0066176 A1 | 3/2007 | Wenstrup et al. |
| 2007/0102108 A1 | 5/2007 | Zheng |
| 2007/0125275 A1 | 6/2007 | Bui |
| 2007/0148339 A1 | 6/2007 | Wescott |
| 2007/0166516 A1 | 7/2007 | Kim et al. |
| 2007/0184244 A1 | 8/2007 | Doehring |
| 2007/0207296 A1 | 9/2007 | Eisermann |
| 2007/0218260 A1 | 9/2007 | Miclo et al. |
| 2007/0224438 A1 | 9/2007 | Van Benthem et al. |
| 2007/0256804 A1 | 11/2007 | Garcis Espino et al. |
| 2008/0000179 A1 | 1/2008 | Pervan et al. |
| 2008/0000190 A1 | 1/2008 | Håkansson |
| 2008/0000417 A1 | 1/2008 | Pervan et al. |
| 2008/0032120 A1 | 2/2008 | Braun |
| 2008/0090032 A1 | 4/2008 | Perrin et al. |
| 2008/0093013 A1 | 4/2008 | Muller |
| 2008/0152876 A1 | 6/2008 | Magnusson |
| 2008/0176039 A1 | 7/2008 | Chen et al. |
| 2008/0263985 A1 | 10/2008 | Hasch et al. |
| 2009/0056257 A1 | 3/2009 | Mollinger et al. |
| 2009/0124704 A1 | 5/2009 | Jenkins |
| 2009/0135356 A1 | 5/2009 | Ando |
| 2009/0145066 A1 | 6/2009 | Pervan |
| 2009/0155612 A1 | 6/2009 | Pervan et al. |
| 2009/0165946 A1* | 7/2009 | Suzuki ............... B44C 1/1712 156/285 |
| 2009/0208646 A1 | 8/2009 | Kreuder et al. |
| 2009/0294037 A1 | 12/2009 | Oldorff |
| 2009/0311433 A1 | 12/2009 | Wittmann |
| 2010/0092731 A1 | 4/2010 | Pervan et al. |
| 2010/0136303 A1 | 6/2010 | Kreuder |
| 2010/0196678 A1 | 8/2010 | Vermeulen |
| 2010/0223881 A1 | 9/2010 | Kalwa |
| 2010/0239820 A1 | 9/2010 | Buhlmann |
| 2010/0291397 A1 | 11/2010 | Pervan et al. |
| 2010/0300030 A1 | 12/2010 | Pervan et al. |
| 2010/0304089 A1 | 12/2010 | Magnusson |
| 2010/0307675 A1 | 12/2010 | Buhlmann |
| 2010/0307677 A1 | 12/2010 | Buhlmann |
| 2010/0311854 A1 | 12/2010 | Thiers et al. |
| 2010/0314368 A1 | 12/2010 | Groeke |
| 2010/0319282 A1 | 12/2010 | Ruland |
| 2010/0323187 A1 | 12/2010 | Kalwa |
| 2010/0330376 A1 | 12/2010 | Trksak |
| 2011/0175251 A1 | 7/2011 | Ziegler et al. |
| 2011/0177319 A1 | 7/2011 | Ziegler et al. |
| 2011/0177354 A1 | 7/2011 | Ziegler et al. |
| 2011/0189448 A1 | 8/2011 | Lindgren et al. |
| 2011/0247748 A1 | 10/2011 | Pervan et al. |

(56) References Cited

U.S. PATENT DOCUMENTS

| | | |
|---|---|---|
| 2011/0250404 A1 | 10/2011 | Pervan et al. |
| 2011/0262720 A1 | 10/2011 | Riebel et al. |
| 2011/0274872 A1 | 11/2011 | Yu |
| 2011/0283642 A1 | 11/2011 | Meirlaen et al. |
| 2011/0283650 A1 | 11/2011 | Pervan et al. |
| 2011/0287211 A1 | 11/2011 | Bailey et al. |
| 2011/0293823 A1 | 12/2011 | Bruderer et al. |
| 2011/0293906 A1 | 12/2011 | Jacobsson |
| 2012/0048487 A1 | 3/2012 | Brewster |
| 2012/0124932 A1 | 5/2012 | Schulte et al. |
| 2012/0263878 A1 | 10/2012 | Ziegler et al. |
| 2012/0263965 A1 | 10/2012 | Persson et al. |
| 2012/0264853 A1 | 10/2012 | Ziegler et al. |
| 2012/0276348 A1 | 11/2012 | Clausi et al. |
| 2012/0279161 A1 | 11/2012 | Håkansson et al. |
| 2012/0288689 A1 | 11/2012 | Hansson et al. |
| 2012/0308774 A1 | 12/2012 | Persson et al. |
| 2013/0025216 A1 | 1/2013 | Reichwein et al. |
| 2013/0092314 A1 | 4/2013 | Zeigler et al. |
| 2013/0095315 A1 | 4/2013 | Pervan et al. |
| 2013/0111845 A1 | 5/2013 | Pervan et al. |
| 2013/0189534 A1 | 7/2013 | Pervan et al. |
| 2013/0196119 A1 | 8/2013 | Dobecz |
| 2013/0269863 A1 | 10/2013 | Pervan et al. |
| 2013/0273244 A1 | 10/2013 | Vetter et al. |
| 2013/0273245 A1 | 10/2013 | Ziegler et al. |
| 2014/0027020 A1 | 1/2014 | Klaeusler et al. |
| 2014/0044872 A1 | 2/2014 | Pervan |
| 2014/0075874 A1 | 3/2014 | Pervan et al. |
| 2014/0147585 A1 | 5/2014 | Smith |
| 2014/0171554 A1 | 6/2014 | Ziegler et al. |
| 2014/0178630 A1 | 6/2014 | Pervan et al. |
| 2014/0186610 A1 | 7/2014 | Pervan |
| 2014/0199558 A1 | 7/2014 | Pervan et al. |
| 2014/0234531 A1 | 8/2014 | Ziegler et al. |
| 2014/0290171 A1 | 10/2014 | Vermeulen |
| 2014/0329064 A1 | 11/2014 | Döhring et al. |
| 2015/0017461 A1 | 1/2015 | Lindgren et al. |
| 2015/0072111 A1 | 3/2015 | Rischer et al. |
| 2015/0079280 A1 | 3/2015 | Vetter et al. |
| 2015/0093502 A1 | 4/2015 | Ziegler et al. |
| 2015/0111055 A1 | 4/2015 | Persson et al. |
| 2015/0118456 A1 | 4/2015 | Carlborg et al. |
| 2015/0159382 A1 | 6/2015 | Pervan |
| 2015/0197942 A1 | 7/2015 | Pervan et al. |
| 2015/0197943 A1 | 7/2015 | Ziegler et al. |
| 2015/0275526 A1 | 10/2015 | Persson et al. |
| 2015/0298433 A1 | 10/2015 | Kalwa |
| 2016/0031189 A1 | 2/2016 | Pervan et al. |
| 2016/0114495 A1 | 4/2016 | Pervan et al. |
| 2016/0186318 A1 | 6/2016 | Pervan et al. |
| 2016/0230400 A9 | 8/2016 | Pervan et al. |
| 2016/0297174 A1 | 10/2016 | Kim |
| 2016/0322041 A1 | 11/2016 | Kim |
| 2016/0326744 A1 | 11/2016 | Döhring et al. |
| 2016/0368180 A1 | 12/2016 | Ziegler et al. |
| 2016/0375674 A1 | 12/2016 | Schulte |
| 2017/0120564 A1 | 5/2017 | Schulte |
| 2017/0165936 A1 | 6/2017 | Schulte |
| 2017/0190156 A1 | 7/2017 | Lundblad et al. |
| 2017/0305119 A1 | 10/2017 | Bergelin et al. |
| 2017/0348984 A1 | 12/2017 | Pervan et al. |
| 2018/0002934 A1 | 1/2018 | Pervan et al. |
| 2018/0291638 A1 | 10/2018 | Pervan |
| 2018/0370278 A1 | 12/2018 | Persson et al. |
| 2019/0010711 A1 | 1/2019 | Pervan et al. |
| 2019/0202178 A1 | 7/2019 | Ziegler |
| 2019/0210329 A1 | 7/2019 | Ziegler et al. |
| 2019/0210330 A1 | 7/2019 | Ziegler et al. |
| 2019/0277039 A1 | 9/2019 | Håkansson et al. |
| 2019/0284821 A1 | 9/2019 | Pervan |
| 2019/0292796 A1 | 9/2019 | Pervan et al. |
| 2019/0338534 A1 | 11/2019 | Pervan |
| 2020/0055287 A1 | 2/2020 | Lundblad et al. |
| 2020/0078825 A1 | 3/2020 | Jacobsson |
| 2020/0079059 A1 | 3/2020 | Schulte |
| 2020/0094512 A1 | 3/2020 | Schulte |
| 2020/0164622 A1 | 5/2020 | Pervan et al. |
| 2020/0215799 A1 | 7/2020 | Hedlund et al. |
| 2020/0223197 A1 | 7/2020 | Hedlund et al. |
| 2021/0001647 A1 | 1/2021 | Pervan et al. |
| 2021/0008863 A1 | 1/2021 | Bergelin et al. |
| 2021/0078305 A1 | 3/2021 | Schulte |
| 2021/0010131 A1 | 4/2021 | Lindgren et al. |
| 2021/0197534 A1 | 7/2021 | Ziegler et al. |
| 2021/0277670 A1 | 9/2021 | Ziegler et al. |
| 2021/0323297 A1 | 10/2021 | Slottemo et al. |
| 2022/0009248 A1 | 1/2022 | Ryberg et al. |
| 2022/0024189 A1 | 1/2022 | Ziegler et al. |
| 2022/0024195 A1 | 1/2022 | Schulte |

FOREIGN PATENT DOCUMENTS

| | | |
|---|---|---|
| CA | 2 557 096 A1 | 7/2005 |
| CA | 2 852 656 A1 | 4/2013 |
| CH | 298894 A | 5/1954 |
| CN | 1709717 A | 12/2005 |
| CN | 102166775 A | 8/2011 |
| CN | 202200608 U | 4/2012 |
| CN | 104084994 A | 10/2014 |
| DE | 1 815 312 A1 | 7/1969 |
| DE | 7148789 U | 4/1972 |
| DE | 29 39 828 A1 | 4/1981 |
| DE | 33 34 921 A1 | 4/1985 |
| DE | 36 34 885 A1 | 4/1988 |
| DE | 42 33 050 A1 | 4/1993 |
| DE | 42 36 266 A1 | 5/1993 |
| DE | 202 14 532 U1 | 2/2004 |
| DE | 102 45 914 A1 | 4/2004 |
| DE | 103 00 247 A1 | 7/2004 |
| DE | 103 31 657 A1 | 2/2005 |
| DE | 20 2004 003 061 U1 | 7/2005 |
| DE | 10 2004 050 278 A1 | 4/2006 |
| DE | 20 2006 007 797 U1 | 8/2006 |
| DE | 10 2005 046 264 A1 | 4/2007 |
| DE | 10 2006 024 593 A1 | 12/2007 |
| DE | 10 2006 058 244 A1 | 6/2008 |
| DE | 10 2007 043 202 A1 | 3/2009 |
| DE | 20 2009 008 367 U1 | 9/2009 |
| DE | 10 2010 045 266 A | 3/2012 |
| DE | 20 2013 011 776 U1 | 7/2014 |
| DE | 20 2014 102 031 U1 | 7/2014 |
| DE | 20 2013 012 020 U1 | 2/2015 |
| DE | 10 2013 113 125 A1 | 5/2015 |
| EP | 0 129 430 A2 | 12/1984 |
| EP | 0 129 430 B1 | 1/1990 |
| EP | 0 355 829 A2 | 2/1990 |
| EP | 0 611 408 A1 | 12/1993 |
| EP | 0 592 013 A2 | 4/1994 |
| EP | 6 656 443 A1 | 6/1995 |
| EP | 0 611 408 B1 | 9/1996 |
| EP | 0 732 449 A1 | 9/1996 |
| EP | 0 744 477 A2 | 11/1996 |
| EP | 0 914 914 A2 | 5/1999 |
| EP | 0 732 449 B1 | 8/1999 |
| EP | 0 744 477 B1 | 1/2000 |
| EP | 1 035 255 A1 | 9/2000 |
| EP | 1 125 971 A1 | 8/2001 |
| EP | 1 136 251 A2 | 9/2001 |
| EP | 1 193 288 A1 | 4/2002 |
| EP | 1 209 199 A1 | 5/2002 |
| EP | 1 242 702 A1 | 9/2002 |
| EP | 1 249 322 A1 | 10/2002 |
| EP | 1 388 414 A1 | 2/2004 |
| EP | 1 454 763 A2 | 9/2004 |
| EP | 1 242 702 B1 | 11/2004 |
| EP | 1 498 241 A2 | 1/2005 |
| EP | 1 507 664 A1 | 2/2005 |
| EP | 1 507 664 B1 | 2/2005 |
| EP | 1 584 378 A1 | 10/2005 |
| EP | 1 681 103 A2 | 7/2006 |
| EP | 1 690 603 A1 | 8/2006 |
| EP | 1 847 385 A1 | 10/2007 |
| EP | 1 961 556 A1 | 8/2008 |

(56) References Cited

FOREIGN PATENT DOCUMENTS

| | | |
|---|---|---|
| EP | 1 985 464 A1 | 10/2008 |
| EP | 1 997 623 A1 | 12/2008 |
| EP | 2 025 484 A1 | 2/2009 |
| EP | 1 454 763 B1 | 8/2009 |
| EP | 2 105 320 A1 | 9/2009 |
| EP | 2 119 550 A1 | 11/2009 |
| EP | 2 213 476 A1 | 8/2010 |
| EP | 2 226 201 A1 | 9/2010 |
| EP | 2 246 500 A2 | 11/2010 |
| EP | 2 263 867 A1 | 12/2010 |
| EP | 2 264 259 A2 | 12/2010 |
| EP | 2 272 667 A1 | 1/2011 |
| EP | 2 272 668 A1 | 1/2011 |
| EP | 2 305 462 A1 | 4/2011 |
| EP | 2 353 861 A1 | 8/2011 |
| EP | 1 847 385 B1 | 9/2011 |
| EP | 2 263 867 B1 | 3/2012 |
| EP | 2 902 196 B1 | 8/2016 |
| ER | 0 234 220 A2 | 9/1987 |
| ER | 0 993 934 A2 | 4/2000 |
| ER | 1 262 607 A1 | 12/2002 |
| ER | 1 657 055 A1 | 5/2006 |
| ER | 1 808 311 A1 | 7/2007 |
| ER | 2 415 947 A2 | 2/2012 |
| ER | 2 902 196 A1 | 1/2014 |
| FR | 801 433 A | 8/1936 |
| FR | 2 873 953 A1 | 2/2006 |
| GB | 785008 | 10/1957 |
| GB | 984 170 A | 2/1965 |
| GB | 1090450 | 11/1967 |
| GB | 1 561 820 A | 3/1980 |
| GB | 2 238 983 A | 6/1991 |
| GB | 2 248 246 A | 4/1992 |
| GB | 2 464 541 A | 4/2010 |
| JP | 51-128409 A | 11/1976 |
| JP | 52-087212 A | 7/1977 |
| JP | S53-148506 A | 12/1978 |
| JP | S56-049259 A | 5/1981 |
| JP | S56-151564 A | 11/1981 |
| JP | S58-084761 A | 5/1983 |
| JP | S59-101312 A | 6/1984 |
| JP | S64-062108 A | 3/1989 |
| JP | H02-188206 A | 7/1990 |
| JP | H02-198801 A | 8/1990 |
| JP | 2-229002 A | 9/1990 |
| JP | H03-030905 A | 2/1991 |
| JP | H03-211047 A | 9/1991 |
| JP | H03-267174 A | 11/1991 |
| JP | H04-107101 A | 4/1992 |
| JP | H04-247901 A | 9/1992 |
| JP | H04-269506 A | 9/1992 |
| JP | H05-077362 A | 3/1993 |
| JP | H05-237809 A | 9/1993 |
| JP | H06-312406 A | 11/1994 |
| JP | H07-060704 A | 3/1995 |
| JP | H08-207012 A | 8/1996 |
| JP | H09-164651 A | 6/1997 |
| JP | H10-002098 A | 1/1998 |
| JP | H10-18562 A | 1/1998 |
| JP | H10-86107 A | 4/1998 |
| JP | 2925749 B2 | 7/1999 |
| JP | 11-291203 A | 10/1999 |
| JP | 2000-226931 A | 8/2000 |
| JP | 2000-263520 A | 9/2000 |
| JP | 2001-287208 A | 10/2001 |
| JP | 2001-329681 A | 11/2001 |
| JP | 2003-311717 A | 11/2003 |
| JP | 2003-311718 A | 11/2003 |
| JP | 2004-068512 A | 3/2004 |
| JP | 2004-076476 A | 3/2004 |
| JP | 2005-034815 A | 2/2005 |
| JP | 2005-074682 A | 3/2005 |
| JP | 2005-170016 A | 6/2005 |
| JP | 2005-219215 A | 8/2005 |
| JP | 3705482 B2 | 10/2005 |
| JP | 2005-307582 A | 11/2005 |
| JP | 2007-098755 A | 4/2007 |
| JP | 2007-216692 A | 8/2007 |
| JP | 2007-268843 A | 10/2007 |
| JP | 2008-188826 A | 8/2008 |
| JP | 2010-017963 A | 1/2010 |
| JP | 2011-110768 A | 6/2011 |
| KR | 10-0997149 B1 | 11/2010 |
| KR | 10-1439066 B1 | 9/2014 |
| NZ | 225556 A1 | 2/1992 |
| SE | 469 326 B | 6/1993 |
| WO | WO 92/06832 A1 | 4/1992 |
| WO | WO 93/24295 A1 | 12/1993 |
| WO | WO 93/24296 A1 | 12/1993 |
| WO | WO 94/00280 A1 | 1/1994 |
| WO | WO 95/06568 A1 | 3/1995 |
| WO | WO 00/22225 A1 | 4/2000 |
| WO | WO 00/44576 A1 | 8/2000 |
| WO | WO 01/00409 A1 | 1/2001 |
| WO | WO 01/48333 A1 | 7/2001 |
| WO | WO 01/64408 A1 | 9/2001 |
| WO | WO 01/68367 A1 | 9/2001 |
| WO | WO 01/92037 A2 | 12/2001 |
| WO | WO 02/42167 A2 | 5/2002 |
| WO | WO 02/42373 A1 | 5/2002 |
| WO | WO 03/078761 A1 | 9/2003 |
| WO | WO 03/095202 A1 | 11/2003 |
| WO | WO 2004/042168 A1 | 5/2004 |
| WO | WO 2004/050359 A1 | 6/2004 |
| WO | WO 2004/067874 A2 | 8/2004 |
| WO | WO 2005/035209 A2 | 4/2005 |
| WO | WO 2005/035209 A3 | 4/2005 |
| WO | WO 2005/035209 B1 | 4/2005 |
| WO | WO 2005/054599 A1 | 6/2005 |
| WO | WO 2005/054600 A1 | 6/2005 |
| WO | WO 2005/066431 A2 | 7/2005 |
| WO | WO 2005/080096 A2 | 9/2005 |
| WO | WO 2005/097874 A2 | 10/2005 |
| WO | WO 2005/116337 A1 | 12/2005 |
| WO | WO 2005/116361 A1 | 12/2005 |
| WO | WO 2006/007413 A1 | 1/2006 |
| WO | WO 2006/013469 A1 | 2/2006 |
| WO | WO 2006/015313 A2 | 2/2006 |
| WO | WO 2006/042651 A1 | 4/2006 |
| WO | WO 2006/043893 A1 | 4/2006 |
| WO | WO 2006/066776 A2 | 6/2006 |
| WO | WO 2006/126930 A1 | 11/2006 |
| WO | WO 2007/015669 A2 | 2/2007 |
| WO | WO 2007/015669 A3 | 2/2007 |
| WO | WO 2007/042258 A1 | 4/2007 |
| WO | WO 2007/059294 A2 | 5/2007 |
| WO | WO 2008/004960 A2 | 1/2008 |
| WO | WO 2008/004960 A3 | 1/2008 |
| WO | WO 2008/004960 A8 | 1/2008 |
| WO | WO 2008/148771 A1 | 12/2008 |
| WO | WO 2009/015682 A1 | 2/2009 |
| WO | WO 2009/050565 A1 | 4/2009 |
| WO | WO 2009/065768 A1 | 5/2009 |
| WO | WO 2009/065769 A2 | 5/2009 |
| WO | WO 2009/065769 A3 | 5/2009 |
| WO | WO 2009/080772 A1 | 7/2009 |
| WO | WO 2009/080813 A1 | 7/2009 |
| WO | WO 2009/116926 A1 | 9/2009 |
| WO | WO 2009/124704 A1 | 10/2009 |
| WO | WO 2010/046698 A1 | 4/2010 |
| WO | WO 2010/084466 A2 | 7/2010 |
| WO | WO 2010/087752 A1 | 8/2010 |
| WO | WO 2010/094500 A1 | 8/2010 |
| WO | WO 2011/058233 A1 | 5/2011 |
| WO | WO 2011/087422 A1 | 7/2011 |
| WO | WO 2011/087423 A1 | 7/2011 |
| WO | WO 2011/087424 A1 | 7/2011 |
| WO | WO 2011/129755 A2 | 10/2011 |
| WO | WO 2011/129757 A1 | 10/2011 |
| WO | WO 2011/141851 A2 | 11/2011 |
| WO | WO 2012/004699 A2 | 1/2012 |
| WO | WO 2012/076608 A1 | 6/2012 |
| WO | WO 2012/141647 A1 | 10/2012 |
| WO | WO 2012/154113 A1 | 11/2012 |

(56) References Cited

FOREIGN PATENT DOCUMENTS

| WO | WO 2013/056745 A1 | 4/2013 |
|---|---|---|
| WO | WO 2013/079950 A1 | 6/2013 |
| WO | WO 2013/139460 A1 | 9/2013 |
| WO | WO 2013/167576 A2 | 11/2013 |
| WO | WO 2013/182191 A2 | 12/2013 |
| WO | WO 2013/182191 A3 | 12/2013 |
| WO | WO 2014/017972 A1 | 1/2014 |
| WO | WO 2014/109699 A1 | 7/2014 |
| WO | WO 2015/078434 A1 | 6/2015 |
| WO | WO 2015/078443 A1 | 6/2015 |
| WO | WO 2015/078444 A1 | 6/2015 |
| WO | WO 2015/105455 A1 | 7/2015 |
| WO | WO 2015/105456 A1 | 7/2015 |
| WO | WO 2015/106771 A1 | 7/2015 |
| WO | WO 2015/174909 A1 | 11/2015 |
| WO | WO 2016/151435 A1 | 9/2016 |

OTHER PUBLICATIONS

Lundblad, Christer, et al., U.S. Appl. No. 15/308,737, entitled "A Method of Producing a Veneered Element and Such a Veneered Element," filed in the U.S. Patent and Trademark Office Nov. 3, 2016.
U.S. Appl. No. 14/192,169, filed Feb. 27, 2014, Darko Pervan, (Cited herein as US Patent Application Publication No. 2014/0178630 A1 of Jun. 26, 2014; Republication No. 2016/0230400 A9 of Aug. 11, 2016).
U.S. Appl. No. 14/593,458, filed Jan. 9, 2015, Göran Ziegler, (Cited herein as US Patent Application Publication No. 2015/0197943 A1 of Jul. 16, 2015).
International Search Report and Written Opinion (Forms PCT/ISA/220, PCT/ISA/210) dated Sep. 12, 2016 in PCT/SE2016/050583, ISA/SE, Patent-och registreringsverket, Stockholm, SE, 15 pages.
Parquet International, "Digital Printing is still an expensive process," Mar. 2008, cover page/pp. 78-79, www.parkettmagazin.com.
Floor Daily, "Shaw Laminates: Green by Design," Aug. 13, 2007, 1 pg, Dalton, GA.
BTLSR Toledo, Inc. website. http://www.btlresins.com/more.html. "Advantages to Using Powdered Resins," May 26, 2007, 2 pages, per the Internet Archive WayBackMachine.
Nimz, H.H., "Wood," Ullmann's Encyclopedia of Industrial Chemistry, published online Jun. 15, 2000, pp. 453-505, vol. 39, Wiley-VCH Verlag GmbH & Co. KgaA, Weinheim, DE.
Le Fur, X., et al., "Recycling melamine-impregnated paper waste as board adhesives," published online Oct. 26, 2004, pp. 419-423, vol. 62, Springer-Verlag, DE.
Odian, George, "Principles of Polymerization," 1991, 3$^{rd}$ Edition, 5 pages incl. pp. 122-123, John Wiley & Sons, Inc., New York, NY, USA.
Engstrand, Ola (Contact)/Valinge Innovation, Technical Disclosure entitled "Fibre Based Panels With a Wear Resistance Surface," Nov. 17, 2008, IP.com No. IPCOM000176590D, IP.com PriorArtDatabase, 76 pages.
Engstrand, Ola (Contact)/Valinge Innovation, Technical Disclosure entitled "WFF Embossing," May 15, 2009, IP.com No. IPCOM000183105D, IP.com PriorArtDatabase, 36 pages.
Engstrand, Ola (Contact)/Valinge Innovation, Technical Disclosure entitled "VA063 VA064 Scattering and Powder Backing," Nov. 11, 2011, IP.com No. IPCOM000212422D, IP.com PriorArtDatabase, 34 pages.
Bergelin, Marcus, et al., U.S. Appl. No. 15/495,357, entitled "A Veneered Element and Method of Producing Such a Veneered Element," filed in the U.S. Patent and Trademark Office on Apr. 25, 2017.
Schulte, Guido, U.S. Appl. No. 16/556,289 entitled "Floorboard," filed in the U.S. Patent and Trademark Office on Aug. 30, 2019.
Schulte, Guido, U.S. Appl. No. 16/571,547 entitled "Floor, Wall, or Ceiling Panel and Method for Producing Same," filed in the U.S. Patent and Trademark Office on Sep. 16, 2019.

U.S. Appl. No. 15/039,638, filed May 26, 2016, Guido Schulte, (Cited herein as US Patent Application Publication No. 2017/0120564 A1 of May 4, 2017).
U.S. Appl. No. 15/039,748, filed May 26, 2016, Guido Schulte, (Cited herein as US Patent Application Publication No. 2016/0375674 A1 of Dec. 29, 2016).
U.S. Appl. No. 15/039,504, filed May 26, 2016, Guido Schulte, (Cited herein as US Patent Application Publication No. 2017/0165936 A1 of Jun. 15, 2017).
U.S. Appl. No. 16/132,977, filed Sep. 17, 2018, Darko Pervan.
Extended European Search Report issued in EP 16812046.7, dated Jan. 14, 2019, 8 pages, European Patent Office, Munich, DE.
Mercene Labs, official home page, retrieved Feb. 23, 2017, retrieved from the Internet: http://www.mercenelabs.com/technology/, according to the Internet Archive WayBack Machine this page was available on Jan. 22, 2013.
Ziegler, Göran, U.S. Appl. No. 16/325,543 entitled "A Method to Coat a Building Panel and Such a Coated Building Panel," filed in the U.S. Patent and Trademark Office on Feb. 14, 2019.
Pervan, Darko, et al., U.S. Appl. No. 16/132,977 entitled "Wood Fibre Based Panel With a Surface Layer," filed in the U.S. Patent and Trademark Office on Sep. 17, 2018.
Ziegler, Göran, U.S. Appl. No. 16/223,708 entitled "A Method to Produce a Veneered Element and a Veneered Element," filed in the U.S. Patent and Trademark Office on Dec. 18, 2018.
Ziegler, Göran, U.S. Appl. No. 16/223,833 entitled "A Method to Produce a Veneered Element and a Veneered Element," filed in the U.S. Patent and Trademark Office on Dec. 18, 2018.
Lundblad, Christer, et al., U.S. Appl. No. 16/365,764 entitled "A Method of Producing a Veneered Element and Such a Veneered Element," filed in the U.S. Patent and Trademark Office on Mar. 27, 2019.
Fang, Chang-Hua, et al., "Densification of wood veneers by compression combined with heat and steam," *Eur. J. Wood Prod.*, 2012, pp. 155-163, vol. 70, Springer-Verlag, Germany (available online Feb. 1, 2011).
Hedlund, Anette, et al., U.S. Appl. No. 16/738,334 entitled "Method to Produce a Veneer Element and a Veneer Element," filed in the U.S. Patent and Trademark Office on Jan. 9, 2020.
Mercene Labs, "Technology," retrieved Mar. 28, 2020, 2 pages, retrieved from the Internet https://web.archive.org/web/20160324064537/http://www.mercenelabs.com/technology/ according to the Internet Archive WayBack Machine this page was available on Mar. 24, 2016 (XP055674254).
Mercene Labs, "Technology," retrieved Mar. 28, 2020, 2 pages, retrieved from the Internet https://web.archive.org/web/20150204025422/http://www.mercenelabs.com:80/technology/ according to the Internet Archive WayBack Machine this page was available on Feb. 4, 2015 (XP055674258).
Mercene Labs, "Industrial coatings," retrieved Mar. 28, 2020, 2 pages, retrieved from the Internet https://web.archive.org/web/20140825055945/http://www.mercenelabs.com/products/coating-of-difficult-substrates/ according to the Internet Archive WayBack Machine this page was available on Aug. 25, 2014 (XP055674250).
Bergelin, Marcus, et al., U.S. Appl. No. 17/038,567 entitled "Veneered Element and Method of Producing Such a Veneered Element," filed in the U.S. Patent and Trademark Office Sep. 30, 2020.
Schulte, Guido, U.S. Appl. No. 17/090,511 entitled "Floor, Wall, or Ceiling Panel and Method for Producing Same," filed in the U.S. Patent and Trademark Office Nov. 5, 2020.
Ziegler, Göran, et al., U.S. Appl. No. 17/202,836 entitled "Method to Produce a Veneered Element and a Veneered Element," filed in the U.S. Patent and Trademark Office Mar. 16, 2021.
Ziegler, Göran, et al., U.S. Appl. No. 17/205,469 entitled "Method of Producing a Veneered Element," filed in the U.S. Patent and Trademark Office Mar. 18, 2021.
Slottemo, Andreas, et al., U.S. Appl. No. 17/232,687 entitled "Method for Producing a Building Element, a Pressing Device and a Method of Embossing a Wooden Surface," filed in the U.S. Patent and Trademark Office on Apr. 16, 2021.
Schulte, Guido, U.S. Appl. No. 17/352,942 entitled "Method for Producing a Floorboard," filed in the U.S. Patent and Trademark Office on Jun. 21, 2021.

(56) References Cited

OTHER PUBLICATIONS

U.S. Appl. No. 17/496,441, Göran Ziegler, filed Ovt. 7, 2021.
Ziegler, Göran, et al., U.S. Appl. No. 17/496,411 entitled "Method to Produce a Veneered Element and a Veneered Element," filed in U.S. Patent and Trademark office on Oct. 7, 2021.
U.S. Appl. No. 17/543,962, Magnus Nilsson, filed Dec. 7, 2021.
Nilsson, Magnus, et al., U.S. Appl. No. 17/543,962 entitled "Method to Produce a Veneered Element and a Veneered Element," filed in the U.S. Patent and Trademark Office Dec. 7, 2021.

* cited by examiner

METHOD OF FORMING A BUILDING PANEL OR SURFACE ELEMENT AND SUCH A BUILDING PANEL AND SURFACE ELEMENT

CROSS REFERENCE TO RELATED APPLICATIONS

The present application claims the benefit of Swedish Application No. 1550827-8, filed on Jun. 16, 2015. The entire contents of Swedish Application No. 1550827-8 are hereby incorporated herein by reference in their entirety.

TECHNICAL FIELD

The present disclosure relates to a method of forming a building panel or a surface element comprising a mesh structure, and such a building panel and surface element.

TECHNICAL BACKGROUND

A new type of floors has recently been developed with a solid surface comprising a substantially homogenous mix of wood particles, a binder and wear resistant particles. Such floor and building panels are marketed under the trademark NADURA®.

The panels are produced according to a production method, which is described in WO 2009/065769, wherein the mix comprising wood fibres, binder and wear resistant particles is applied in powder form on a core. Lignocellulosic wood material may be used. The wood fibres are generally refined, mechanically worked, and of the same type as used in HDF and particleboard, i.e., treated in a way that the lignin content is essentially unchanged. The wear resistant particles are preferably aluminium oxide particles. The surface layer comprises preferably also colour pigments and/or other decorative materials or additives. Processed fibres such as cellulosic fibres may also be used. The processed fibres may be at least partially bleached wood fibres. The binder is preferably melamine formaldehyde resin.

The mix is scattered in dry powder form on a wood based core, such as for example HDF. The mix is cured under heat and pressure to a 0.1-1.0 mm thick decorative surface layer.

Powder technology is very suitable to produce a decorative surface layer, which is a copy of stone and ceramics mainly comprising one colour or a mix of two colours. In the past it was more difficult to create advanced multi colour designs such as for example wood decors. However, recently digital powder printing has been developed and it is possible to create very advanced designs of any type by injecting ink into the powder prior to pressing. The surface structure is made in the same way as for laminate flooring by embossed press plates, steal belts or embossed matrix papers that are pressed against the powder surface during lamination.

U.S. Pat. No. 3,392,082 describes that decorative sheet of paper or various textile materials such as cotton, glass or nylon may be impregnated with melamine-formaldehyde resins and used as the outer layer of a laminate to produce normally rigid laminates which are postformable when heated to forming temperatures. Such laminates contain a core consisting of a plurality of paper plies bonded with thermosetting resin, such as the phenolic resins. Lamination of impregnated textile materials and papers is a difficult and costly production method.

WO 2009/065769 further discloses a thin surface layer such as a wood veneer layer, which is applied on a sub-layer comprising, for example, cork or wood fibres mixed with a binder. The sub-layer is applied on a wood fibre based core and serves as a bonding and reinforcement layer for the veneer. Wood veneer combined with a powder-based sub-layer may provide more advanced wood decors than a digitally printed and embossed powder layer. WO 2009/065769 further discloses separate materials such as flakes of wood, metal, plastics, etc. can be used to give the surface improved and more realistic decorative properties that cannot be obtained by, for example, digital printing These separate materials can be pressed into the basic wood fibre surface.

It would be an advantage if a powder based surface layer may be combined with separate additional materials in a simple and cost efficient way in order to improve the properties of the powder based surface.

SUMMARY

It is an object of at least embodiments of the present invention to provide an improvement over the above described techniques and known art.

A further object of at least embodiments of the present invention is to provide a building panel or surface element having improved decorative properties related to design and surface structure.

A further object of at least embodiments of the present invention is to provide a building panel or surface element having improved anti-slip properties.

A further object of at least embodiments of the present invention is to provide a building panel or surface element having improved wear resistance.

A further object of at least embodiments of the present invention is to provide a building panel or surface element having improved impact resistance.

A further object of at least embodiments of the present invention is to provide a building panel or surface element having improved stain resistance.

A further object of at least embodiments of the present invention is to provide a building panel or surface element having improved water resistance.

A further object of at least embodiments of the present invention is to improve wear resistance of certain materials otherwise not suitable as surface material for building panels or surface elements.

At least some of these and other objects and advantages that will be apparent from the description have been achieved by a method of forming a building panel or a surface element according to a first aspect of the invention. The method may comprise:
  providing a substrate,
  applying a sub-layer on a first surface of the substrate,
  applying a mesh structure on the sub-layer, and
  applying pressure, and preferably also heat, to said mesh structure such that the sub-layer at least partially fills meshes of the said mesh structure.

At least a portion of the sub-layer may permeate at least partly through the meshes of the mesh structure. At least a portion of the sub-layer may permeate completely through meshes of the mesh structure.

Preferably, a vapour permeability of the mesh structure layer may exceed 100 SI Perm, preferably exceeds 200 SI Perm, and more preferably exceeds 500 SI Perm.

An advantage of at least embodiments of the present invention is that the mesh structure is reinforced by the sub-layer. The mesh structure may be a material having limited wear resistance, such as a textile, leather, suede, etc.

The mesh structure, for example, a textile, provides decorative properties to the building panel or surface element. The mesh structure is reinforced by the sub-layer such that the mesh structure may form part of a building panel or surface element and provide wear resistance properties thanks to the sub-layer. Thereby, a material such as a textile, which otherwise would not provide sufficient wear resistance, may form the surface of the building panel or surface element or surface element, and the decorative properties of such materials can be used for a building panel or surface element subjected to wear.

Furthermore, the sub-layer may also provide water-resistance to a material, which otherwise would not provide sufficient water resistant properties, for example by impregnating the material of the mesh structure.

The mesh structure forms part of a decorative surface of the building panel or surface element. The mesh structure, and in certain embodiments together with the sub-layer, provides the decorative surface of the building panel or surface element.

The mesh structure may be impregnated by the sub-layer during pressing. As an example, a mesh structure in form of a textile material may be impregnated by a binder present in the sub-layer during pressing.

The mesh structure may provide the building panel or surface element with slip resistance. The mesh structure may provide the building panel or surface element with a structure that may protrude from the sub-layer. The protruding parts may form a slip resistant pattern of the building panel or surface element.

The mesh structure may also provide conductivity, for example, electrical conductivity, to the building panel or surface element.

The mesh structure may also increase, or decrease, the heat conductivity of the building panel or surface element.

Furthermore, the mesh structure allows that under pressing, a condensation reaction product, for example, water, may escape through meshes of the mesh structure.

By applying heat and pressure, the mesh structure is attached to the sub-layer such that a building panel or surface element is formed by at least the mesh structure and the sub-layer. The mesh structure may be mechanically and/or chemically connected to the sub-layer.

The substrate may form part of the building panel after pressing. In such embodiments, the substrate may be a pre-fabricated substrate. The substrate may be a wood-based board, for example, a wood-fibre based board such as MDF or HDF, or plywood. The substrate may be a Wood Plastic Composite (WPC). The substrate may be a mineral composite board. The substrate may be a fibre cement board. The substrate may be magnesium oxide cement board. The substrate may be a ceramic board. The substrate may be a plastic board such as a thermoplastic board. The substrate may be a sheet such as paper sheet. The substrate may be a thermoplastic foil.

In other embodiments, the substrate may be a conveyor belt and/or a temporary carrier. In such embodiments, the mesh structure and the sub-layer may be removed from the substrate such that a surface element formed of the sub-layer and the mesh structure is provided. In this embodiment, the surface element comprising the mesh structure and the sub-layer may form a part of a building panel, such as being configured to form a surface layer of a building panel, and may be attached to a substrate in a subsequent step for forming a building panel. The surface element comprising the mesh structure and the sub-layer may also be used as it is without being adhered to a substrate.

The building panel may be a floor panel, a ceiling panel, a wall panel, a door panel, a worktop, skirting boards, mouldings, edging profiles, furniture component, etc.

The mesh structure may have a substantially uniform vapour permeability in a plane parallel to the first surface of the substrate. Meshes of the mesh structure may have a substantially uniform size. Thereby, the permeation of the sub-layer through the mesh structure is substantially uniform.

The mesh structure is preferably at least semi-permeable, such as having a vapour permeability of at least 57 SI Perm, wherein 1 SI Perm equals 1 $ng/s*m^2*PA$. The mesh structure may be permeable such as having a vapour permeability of at least 570 SI Perm.

The method may include controlling permeation of the sub-layer through the meshes of the mesh structure, and thereby also to the extent the meshes are filled by material from the sub-layer. By controlling permeation of the sub-layer through meshes of the mesh structure, a design of the building panel or surface element may be controlled. Preferably, controlling a design of the building panel or surface element is performed by determining a level of permeation of the sub-layer through the mesh structure. Determining a level of permeation may involve selecting or adjusting the permeation. This may involve selecting or adjusting a fluid pressure of the sub-layer when applying pressure.

By controlling is meant determining, selecting and/or adjusting. By determining is, for example, meant determining by visual impression of the design of the building panel or surface element.

Controlling the fluid pressure of the sub-layer during pressing may include adjusting one or more of the following parameters:
  concentration of a binder in the sub-layer;
  type of binder in the sub-layer;
  formulation of the binder in the sub-layer;
  moisture content of the sub-layer;
  the pressure applied;
  a gas pressure in the sub-layer;
  concentration of fillers in the sub-layer; and
  vapour permeability of the mesh structure.

Adjusting the formulation of the binder in the sub-layer may, for example, comprise optimizing the molar ratio and/or selection of additives in an amino resin, polyol selections in polyesters and urethanes, and/or molecular weight and distribution of thermoplastics.

The step of applying heat and pressure may comprise curing the sub-layer and thereby attaching the mesh structure to the sub-layer. The sub-layer may comprise a thermosetting binder. During condensation reaction of the thermosetting binder when heat and pressure is applied, the mesh structure, and the permeability of the mesh structure, allows that any condensation reaction product such as water may evaporate through the mesh structure, primary through the meshes of the mesh structure. Some binder may also impregnate the material of the mesh structure. Further, the mesh structure, and the permeability of the mesh structure, allows that moisture from the fibres, such as wood fibres or wood particles, which may be included in the sub-layer, can evaporate through the mesh structure.

The sub-layer may be applied as a powder. The sub-layer may comprise a binder and fillers. The binder is preferably applied in powder form.

The mesh structure may be at least partially visible after heat and pressure have been applied. Thereby, the mesh structure may contribute to the decorative properties of the building panel or surface element.

The sub-layer may at least partially encapsulate the mesh structure after pressing. Material from the sub-layer may at least partly permeate through the meshes of the mesh structure such that the sub-layer at least partially encapsulates the mesh structure.

A material forming the mesh structure facing the sub-layer may have a surface roughness exceeding Ra 6.3, wherein Ra defines mean surface deviation measured in µm. By the material forming the mesh structure having a surface roughness exceeding Ra 6.3, the mesh structure is fixed to the sub-layer even if the sub-layer does not encapsulate the mesh structure.

The sub-layer may comprise a thermosetting binder. The permeability of the mesh structure allows transportation of condensation reaction products through the mesh structure, primary through the meshes of the mesh structure during pressing.

The mesh structure may be formed of a metal material. The mesh structure may be an expanded metal.

The mesh structure may be formed of a textile material. The textile material may be a non-woven or a woven structure. The textile material may be cloth, fabric, etc.

The textile material may comprise weaved cotton fibres. The textile material in form of the weaved cotton fibres may have a mesh size and a mesh width exceeding 0.1 mm.

The textile material may be bonded to the sub-layer by a cured thermosetting binder, preferably melamine formaldehyde resin, when applying heat and pressure.

The textile material may be chemically impregnated by the sub-layer by a cured thermosetting binder, preferably melamine formaldehyde resin, when applying heat and pressure.

A melamine formaldehyde resin powder may be applied on the textile material prior to applying heat and pressure.

The textile material may be impregnated with a thermosetting binder, preferably melamine formaldehyde resin, prior to applying heat and pressure.

The mesh structure may be formed of plastic material. Plastic material may be used to form a mesh structure similar to expanded metal.

The mesh structure may be formed of a perforated foil. The perforated foil may be a perforated metal foil or perforated plastic foil.

The mesh structure may comprise any one of the following material: metal, textile such as non-woven or woven, plastic, rubber, fibreglass weave, carbon fibres weave, leather, artificial leather, suede, artificial suede, or a combination thereof.

The mesh structure may have a mesh size exceeding 0.1 mm, more preferably exceeding 0.5 mm. The mesh size of the mesh structure may be 0.1-100 mm. The meshes may have a uniform shape, or different meshes may be differently shaped.

The step of applying heat and pressure may comprise heating to a temperature of 150° C.-180° C. and applying a pressure of 20-60 bar on the mesh structure.

According to a second aspect of the present invention, a building panel is provided. The building panel comprises:
 a substrate,
 a sub-layer arranged on a first surface of the substrate, and
 a mesh structure arranged on the sub-layer, wherein meshes of the mesh structure are at least partly filled with material from the sub-layer.

At least a portion of the sub-layer may permeate at least partly through meshes the mesh structure. At least a portion of the sub-layer may permeate completely through meshes of the mesh structure.

Preferably, a vapour permeability of the mesh structure layer may exceed 100 SI Perm, preferably exceeds 200 SI Perm, and more preferably exceeds 500 SI Perm.

An advantage of at least embodiments of the second aspect of the invention is that the mesh structure is reinforced by the sub-layer. The mesh structure may be a material having limited wear resistance, such as a textile, leather, suede, etc. The mesh structure, for example, a textile, provides decorative properties to the building panel. The mesh structure is reinforced by the sub-layer such that the mesh structure may form part of a building panel and provide wear resistance properties thanks to the sub-layer. Thereby, a material such as a textile, which otherwise would not provide sufficient wear resistance, may form the surface of the building panel, and the decorative properties of such materials can be used for a building panel subjected to wear.

Furthermore, the sub-layer may also provide water-resistance to a material, which otherwise would not provide sufficient water resistant properties, for example by impregnating the material of the mesh structure.

The mesh structure may form part of a decorative surface of the building panel. The mesh structure, in certain embodiments together with the sub-layer, provides the decorative surface of the building panel.

The mesh structure may be impregnated by the sub-layer as the sub-layer permeates through the mesh structure. As an example, a mesh structure in form of a textile material may be impregnated by a binder present in the sub-layer during pressing.

The mesh structure may provide the building panel with slip resistance. The mesh structure may provide the building panel with a structure that may protrude from the sub-layer. The protruding parts may form a slip resistant pattern of the building panel.

The mesh structure may also provide conductivity, for example, electrical conductivity, to the building panel.

The mesh structure may also increase, or decrease, the heat conductivity of the building panel.

Furthermore, the mesh structure allows that under pressing, a condensation reaction product, for example, water may escape through the mesh structure.

The mesh structure is attached to the sub-layer such that a building panel is formed by at least the mesh structure and the sub-layer.

The substrate may be a pre-fabricated substrate. The substrate may be a wood-based board, for example, a wood-fibre based board such as MDF or HDF, or plywood. The substrate may be a Wood Plastic Composite (WPC). The substrate may be a mineral composite board. The substrate may be a fibre cement board. The substrate may be magnesium oxide cement board. The substrate may be a ceramic board. The substrate may be a plastic board such as a thermoplastic board. The substrate may be a sheet such as paper sheet. The substrate may be a thermoplastic foil.

The building panel may be a floor panel, a ceiling panel, a wall panel, a door panel, a worktop, skirting boards, mouldings, edging profiles, furniture component, etc.

The mesh structure may have a substantially uniform permeability in a plane parallel to the first surface of the substrate. Meshes of the mesh structure may have a substantially uniform size. Thereby, the permeation of the sub-layer through the mesh structure is substantially uniform.

The mesh structure may be at least partially visible. Thereby, the mesh structure may contribute to the decorative properties of the building panel.

The sub-layer may at least partially encapsulate the mesh structure. Material from the sub-layer may at least partly permeate through the meshes of the mesh structure such that the sub-layer at least partially encapsulates the mesh structure.

A material forming the mesh structure facing the sub-layer may have a surface roughness exceeding Ra 6.3. By the material forming the mesh structure having a surface roughness exceeding Ra 6.3, the mesh structure is fixed to the sub-layer even if the sub-layer does not encapsulate the mesh structure.

The sub-layer may comprise a thermosetting binder. The permeability of the mesh structure allows transportation of condensation reaction products through the mesh structure, primary through the meshes of the mesh structure, during pressing.

The mesh structure may be formed of a metal material. The mesh structure may be an expanded metal.

The mesh structure may be formed of a textile material. The textile material may be a non-woven or a woven structure. The textile material may be cloth, fabric, etc.

The mesh structure may be formed of plastic material. Plastic material may be used to form a mesh structure similar to expanded metal.

The mesh structure may be formed of a perforated foil. The perforated foil may be a perforated metal foil or perforated plastic foil.

The mesh structure may comprise any one of the following material: metal, textile such as non-woven or woven, plastic, rubber, fibreglass weave, carbon fibres weave, leather, artificial leather, suede, artificial suede, or a combination thereof.

The mesh structure may have a mesh size exceeding 0.1 mm, more preferably exceeding 0.5 mm. The mesh size of the mesh structure may be 0.1-100 mm. The meshes may have a uniform shape or different shapes.

The textile material may comprise weaved cotton fibres. The textile material in form of the weaved cotton fibres may have a mesh size and a mesh width of the textile material comprising weaved cotton fibres exceeds 0.1 mm.

The textile material may be bonded to the sub-layer by a cured thermosetting binder, preferably melamine formaldehyde resin.

The textile material may be chemically impregnated by the sub-layer by a cured thermosetting binder, preferably melamine formaldehyde resin.

A protective layer may be arranged on the mesh structure. The protective layer may be formed of a layer of melamine formaldehyde resin powder arranged on the textile material.

The textile material may be impregnated by a thermosetting binder, preferably melamine formaldehyde resin.

The sub-layer may comprise wood fibres and thermosetting resins. The substrate may comprise a wood-based board comprising several layers, wherein at least a first layer comprises thermoplastic material mixed with wood fibres and wherein at least a second layer comprises thermoplastic material mixed with mineral particles.

The building panel may comprise a locking system comprising a tongue at a first edge and a tongue groove at a second edge opposite the first edge, wherein an upper part of the tongue and an upper part of the tongue groove comprise the mineral particles.

According to a third aspect of the invention, a surface element is provided. The surface element comprises a sub-layer and a mesh structure arranged on the sub-layer, wherein meshes of the mesh structure are at least partly filled with material from the sub-layer.

The surface element may be adapted to form part of a building panel.

The third aspect of the invention incorporates all aspect of the first and second aspect of the invention; thereby the previous description is applicable also for the surface element.

Preferably, a vapour permeability of the mesh structure exceeds 100 SI Perm, preferably exceeds 200 SI Perm, and more preferably exceeds 500 SI Perm.

The mesh structure may be formed of a textile material. The textile material may be a non-woven or a woven structure. The textile material may be cloth, fabric, etc.

The surface element may further comprise a protective layer arranged on the mesh structure.

The sub-layer may comprise a thermoplastic foil.

The protective layer may comprise a thermoplastic foil.

The mesh structure may have a substantially uniform permeability in a plane parallel to the first surface of the substrate.

The mesh structure may be at least partially visible.

The sub-layer may at least partially encapsulate the mesh structure.

A material forming the mesh structure facing the sub-layer may have a surface roughness exceeding Ra 6.3.

The sub-layer may comprise a thermosetting binder.

The mesh structure may be formed of a metal material. The mesh structure may be an expanded metal.

The mesh structure may be formed of plastic material.

The mesh structure may be formed of a perforated foil.

The mesh structure may comprise any one of the following material: metal, textile such as non-woven or woven, plastic, rubber, fibreglass weave, carbon fibres weave, leather, artificial leather, suede, artificial suede, or a combination thereof.

The mesh structure may have a mesh size exceeding 0.1 mm, more preferably exceeding 0.5 mm. The mesh size of the mesh structure may be 0.1-100 mm. The meshes may have a uniform shape or different shapes.

BRIEF DESCRIPTION OF THE DRAWINGS

The present disclosure will by way of example be described in more detail with reference to the appended schematic drawings, which show embodiments of the present invention.

DETAILED DESCRIPTION

Figure 1A:
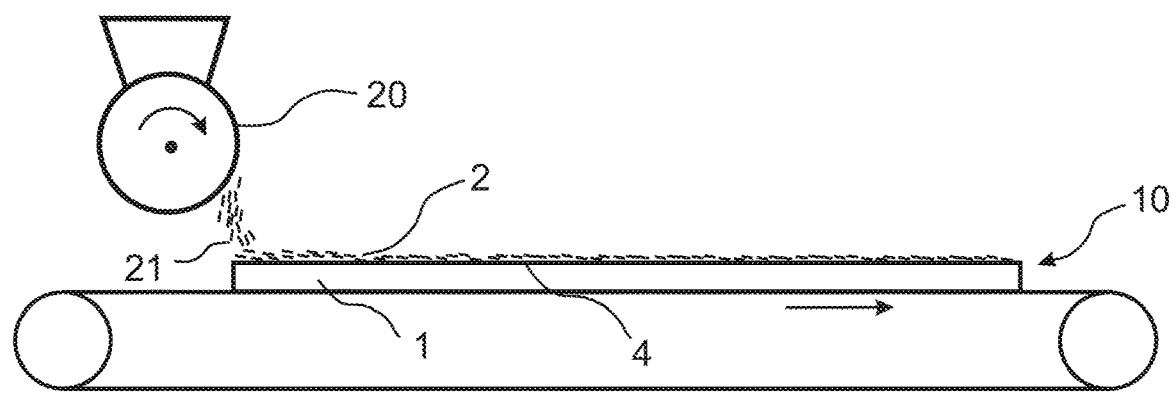
FIGS. 1A-B illustrate a method of forming a building panel according to an embodiment.
Figure 1B:
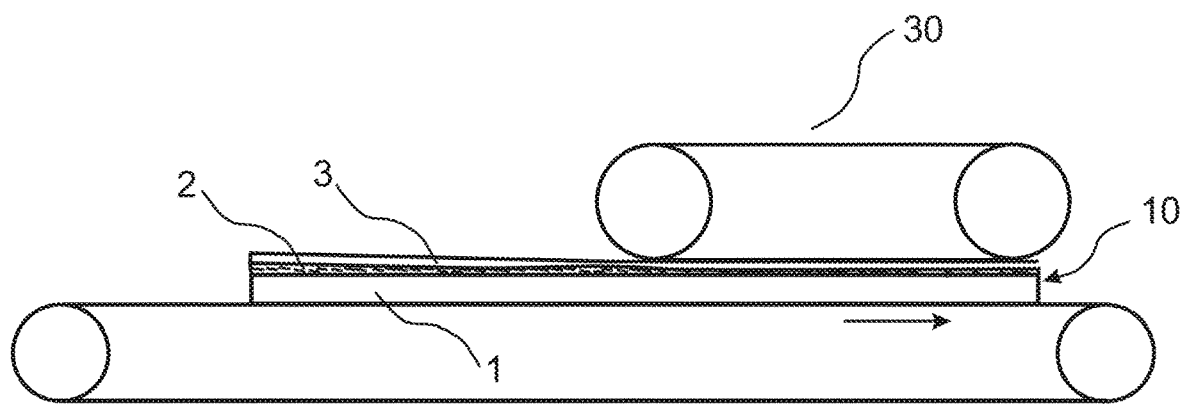

FIGS. 1A-B show a method of producing a building panel 10 or surface element. The building panel 10 or surface element may be, or configured to form part of, a furniture component, a floor panel, a ceiling panel, a wall panel, a door panel, a worktop, skirting boards, mouldings, edging profiles, etc. The method comprises providing a substrate 1. The substrate 1 is preferably a pre-fabricated substrate, manufactured prior to the method of producing the building panel 10. The substrate 1 may be a board, for example, a wood-based board as shown in the embodiment shown in FIGS. 1-4. The wood-based board may be a wood fibre based board such as MDF, HDF, particleboard, or a plywood board. In other embodiments, the substrate may be a Wood Plastic Composite (WPC). The substrate 1 may be a mineral composite board. The substrate 1 may be a fibre cement board. The substrate 1 may be magnesium oxide cement board. The substrate 1 may be a ceramic board. The substrate 1 may be a plastic board such as a thermoplastic board. In another embodiment, the substrate 1 may be a carrier such as sheet of paper or non-woven, or a conveyor. The substrate 1 may be a thermoplastic foil, such as a polyurethane (PU) or polyvinyl chloride (PVC) foil. When the method is used to produce a surface element 11, the conveyor may form the substrate.

A sub-layer 2 is applied on a first surface 4 of the substrate 1. In the embodiment shown in FIG. 1A, the sub-layer 2 is applied in powder form. The powder 21 configured to form the sub-layer 2 is applied by scattering, preferably by a scattering device 20 comprising a roller, as shown in FIG. 1A. The sub-layer 2 may also be applied as granules. In other embodiments, the sub-layer 2 may be applied as a liquid, as a paste, a sheet, as pellets, as agglomerates, etc. The sub-layer 2 may be applied by roller coating, spraying, etc.

In the embodiment wherein the conveyor forms the substrate, the sub-layer 2 is applied directly on the conveyor.

The sub-layer 2 comprises a binder. The binder may be a thermosetting binder, a thermoplastic binder, or a combination thereof. The binder may be wood mastic, wood filler or any other type of putty-like paste. The thermosetting binder may be an amino resin such as melamine formaldehyde resin, phenol formaldehyde resin, urea formaldehyde resin, or a combination thereof. Urea formaldehyde resin may be used, alone or in combination with melamine formaldehyde resin, to reduce tension formed by the sub-layer 2 during curing, compared to when melamine formaldehyde resin is used only. The thermosetting binder may be a polyester, a polyurethane, an epoxy or an acrylic resin. The thermoplastic binder may be polyvinyl chloride (PVC), polyethylene (PE), polypropylene (PP), polyurethane (PU), polyvinyl alcohol (PVOH), polyvinyl butyral (PVB), polyvinyl acetate (PVAc), and/or thermoplastic elastomer (TPE), or a combination thereof. The binder may be a two component binder, such as diol-diisocyanate.

The binder may be in powder form when applied. The binder may be in liquid form when applied. The binder may be applied as pellets, agglomerates or as a sheet.

The sub-layer 2 may be formed of a mix comprising a binder of the above described type and fillers. The mix may further comprise pigments. The mix may further comprise additives. The mix may further comprise wear and/or scratch resistant particles. As an alternative to a mix, the binder, fillers, pigments, additives and any other component may be applied separately on the substrate 1.

The fillers may be particles or fibres, for example wood fibres or particles, or mineral particles or fibres. The wood particles may be lignocellulosic particles and/or cellulosic particles. The wood particles may be at least partially bleached. The fillers may be rice, straw, corn, jute, linen, flax, cotton, hemp, bamboo, bagasse or sisal particles or fibres. The sub-layer may comprise starch such as maize starch, potato starch, etc.

The fillers may be fillers having sound-absorbing properties such as cork particles and/or barium sulphate (BaSO4). Alternatively, a sound-absorbing layer, for example a cork layer or cork veneer layer, may be arranged as an intermediate layer. The sub-layer is applied on the sound-absorbing layer. The sound-absorbing layer may be arranged on the substrate, or on a sub-layer arranged on the substrate.

The pigments may include white pigments such as TiO2. A pigment such as TiO2 can be combined with at least partially bleached wood particles to obtain a white staining of the sub-layer. In one embodiment, a pre-mix is formed by white pigments such as TiO2 and wood particles, preferably at least partially bleached wood particles. The pre-mix is then mixed with remaining wood particles, binder, additives, etc.

The sub-layer 2 may have a uniform colour, different shades, or different portions of the sub-layer may have different colours.

In one embodiment, a digital print may be printed in the sub-layer 2, preferably by an ink jet printer. The colouring and/or pattern of the sub-layer 2 may also be obtained by a binder and print technique (BAP), for example as described in WO 2014/017972.

The additives may be wetting agents, anti-static agents such as carbon black, and heat-conducting additives such as aluminium. Other possible additives are magnetic substances.

The sub-layer 2 may also comprise a foil or a sheet. The sub-layer 2 may be a thermoplastic foil, such as a polyurethane (PU) or polyvinyl chloride (PVC) foil. The sub-layer may be a sheet impregnated with a thermosetting resin, such as a resin impregnated paper.

Additives such as blowing agents may be included in the sub-layer. The blowing agents may be physical foaming agents such as EXPANCEL® and/or chemical blowing agents such as AIBN (azoisobutyronitrile) or ADC (azodicarbonamide).

The wear and/or scratch resistant particles may be aluminium oxide particles and/or silica particles.

In one embodiment, the sub-layer 2 consists essentially of the binder and optionally additives, meaning that at least 90% of the sub-layer 2 is the binder and optional additive(s). In one embodiment, the sub-layer 2 is free from any fibres and/or fillers.

The sub-layer 2 may be applied in an amount of 200-600 g/m2, preferably 300-500 g/m2 such as about 400 g/m2. The amount of binder applied for the sub-layer 2 may be 100-300 g/m2, preferably 150-250 g/m2 such as about 200 g/m2. The sub-layer 2 may comprise the binder in an amount of 30-80 wt %, preferably in an amount of 40-60 wt % such as about 50 wt %.

The sub-layer 2 may be pre-pressed prior to applying a mesh structure 3.

Figure 1C:
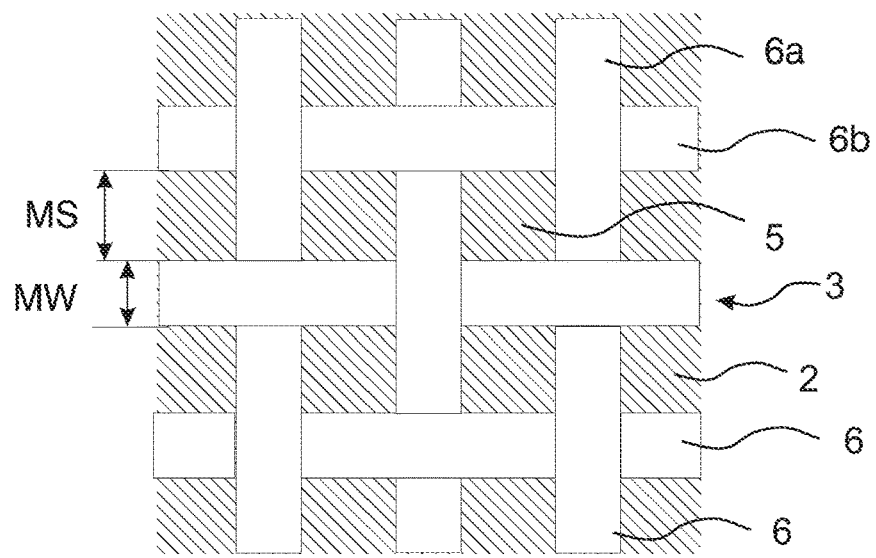
FIG. 1c illustrates a mesh structure in more detail.

In FIG. 1B, a mesh structure 3 has been arranged on the sub-layer 2. The mesh structure 3 comprises several meshes 5 as shown in FIG. 1c in more detail. By meshes 5 are meant openings or holes of the mesh structure 3. The meshes 5 are defined by mesh material 6 of the mesh structure 3 circumscribing the meshes 5. The mesh material 6 has a material width MW. By mesh size MS is meant the distance between mesh material 6. The mesh structure 3 may be formed of a metal material. The mesh structure 3 may be an expanded metal. In another embodiment, the mesh structure 3 may be formed of a plastic material. The mesh structure 3 may be formed of a plastic material, preferably a thermoplastic material, formed as an expanded metal. In another embodiment, the mesh structure 3 may be formed of a perforated foil. The perforated foil may be a perforated metal foil or perforated plastic foil.

In FIG. 1C, the meshes have a quadratic shape. However, the meshes may have any other shape such as rectangular, pentagonal, circular, and elliptical. The meshes may have an aperture dimension long way being different from an aperture dimension short way, i.e., the mesh size MS is different in different directions.

In other embodiments, the mesh structure 3 may be formed of or comprise a textile material. The textile material may be a non-woven or a woven structure. In a woven structure, two distinct sets of threads of mesh material, warp 6a and weft 6b, are interlaced at right angles to form a fabric or cloth as shown in FIG. 1c. The warp runs longitudinally and the weft crosses it. Both warp and weft can be visible in the final product.

The meshes 5 are formed by the spaces between the threads of woven structure.

The mesh structure 3 may comprise any one of the following material: metal, textile such as non-woven or woven, plastic, rubber, fiberglass weave, carbon fibres weave, leather, artificial leather, suede, artificial suede, or a combination thereof. The mesh structure 3 may have an average mesh size, in at least one dimension, exceeding 0.1 mm, more preferably exceeding 0.3 mm. The average area of the meshes may exceed 0.01 $mm^2$, more preferably exceed 1 $mm^2$. The average mesh size of the mesh structure may be 0.1-100 mm. The average area of the meshes may be 0.01-10,000 $mm^2$. The meshes 5 may have a uniform shape. In another embodiment, different meshes 5 may be differently shaped.

The mesh material 6 may have an average mesh width MW exceeding 0.1 mm, preferably exceeding 0.3 mm.

The relation between the average mesh size MS to average mesh width MW is preferably exceeding 1:1 in order to facilitate permeation of the sub-layer 2 through the mesh structure 3.

The mesh structure 3 may be bonded to the sub-layer 2 mechanically when the cured sub-layer 2 grips around at least a part of the mesh material 6. Such bonding takes place for example when the mesh structure 3 comprises metal, and when, for example, a thermosetting binder of the sub-layer 2 cannot penetrate into the mesh structure 3. The mesh material 6 of the mesh structure 3 may also be bonded chemically, for example, when a mesh structure 3 comprises a textile material such as, for example, cotton, that allows a thermosetting binder to penetrate into the fibres during heating and pressing.

The mesh structure 3 may have a substantially uniform vapour permeability in a plane parallel to the first surface of the substrate. Meshes 5 of the mesh structure 3 may have a substantially uniform size. A vapour permeability of the mesh structure 3 may exceed 100 SI Perm, preferably exceeds 200 SI Perm, and more preferably exceeds 500 SI Perm.

As shown in FIG. 1B, pressure and preferably also heat is applied to the mesh structure 3, the sub-layer 2, and/or the substrate 1. Pressure may be applied in a continuous press 30 as shown in FIG. 1B, or in a static press (not shown). After pressing, the mesh structure 3 is attached to the sub-layer 2. Preferably, the sub-layer 2 comprises a thermosetting binder, and the sub-layer 2 is cured by applying heat and pressure. After pressing, the sub-layer 2 is cured and the mesh structure 3 is fixed to the cured sub-layer 2. During pressing, the meshes 5 of the mesh structure 3 allow any condensation reaction products, such as water, to be transported away from the substrate 1. During pressing, material from the sub-layer 2 at least partly fills the meshes 5 of the mesh structure 3. The sub-layer 2, or at least portions of the sub-layer, may permeate, partly or completely, through the meshes 5 of the mesh structure 3. Preferably, at least portions of the mesh structure 3 are still visible after pressing.

A protective layer (not shown) may be arranged on the mesh structure 3 prior or after pressing. The protective layer is preferably transparent. The protective layer may be a coating such as one or several lacquer layers. The coating may be an acrylate or methacrylate coating such as polyurethane coating. The coating may comprise wear and/or scratch resistant particles. The protective layer may be an overlay paper comprising wear resistant particles. The protective layer may be a powder overlay, as described in WO 2011/129755, comprising processed wood fibres, a binder and wear resistant particles applied as mix on the veneer surface. The protective layer may be a thermoplastic foil, such as polyurethane (PU) foil or polyvinyl chloride foil (PVC).

By pressing the mesh structure 3, the sub-layer 2, and/or the substrate 1 together, a building panel 10 or surface element 11 is formed. In embodiment wherein the substrate is formed of, for example, the conveyor, the building panel 10 or surface element 11 being formed of the sub-layer 2 and the mesh structure 3 is removed from the substrate 1.

By controlling the degree of permeation of the sub-layer 2 through the mesh structure 3, and thereby filling the meshes by material from the sub-layer 2, the design of the building panel 10 or surface element 11 can be controlled. The design of the building panel 10 or surface element can be changed by the degree of permeation of the sub-layer 2 through mesh structure 3 and thus being visible at the surface of the building panel 10 or surface element.

For some designs, a large degree of permeation may be desired, and for other designs, less, or varying, permeation may be desired.

Controlling the permeation of the sub-layer 2 can be made in several ways. The design of the building panel or surface element 10 may be controlled by controlling the permeation of the sub-layer 2. The fluid pressure may be controlled and adjusted. The fluid pressure may be varying over the surface of the building panel or surface element 10. The fluid pressure can be increased if a large degree of permeation of the sub-layer 2 is desired. The fluid pressure can be decreased if less permeation of the sub-layer 2 is desired.

The fluid pressure can be controlled in several ways. The fluid pressure can be controlled by controlling the pressure applied to the substrate 2 and/or mesh structure 3. The temperature applied may have influence on the permeation, for example, by changing the viscosity of the sub-layer 2.

The fluid pressure may also be controlled by generating a gas pressure in the sub-layer 2. By generating a gas pressure inside the sub-layer 2, the fluid pressure increases. The gas pressure may be generated by including chemical and/or physical blowing agents in the sub-layer. The chemical and/or physical blowing agents increase the fluid pressure when activated.

The fluid pressure of the sub-layer 2 may also be controlled by adjusting the concentration of binder in the sub-layer 2. By increasing the concentration of the binder of the sub-layer 2, the more material of the sub-layer 2 may permeate through the mesh structure 3. The part of the sub-layer 2 that flows when heat and pressure is applied increases, and thereby a larger part of the sub-layer 2 may permeate through the mesh structure 3. Furthermore, the type of binder may be adjusted. By increasing the amount of a thermosetting binder in the sub-layer 2, the part of the sub-layer 2 being flowable when heat and pressure is applied increases, and thereby the fluid pressure.

The fluid pressure of the sub-layer 2 may also be controlled by adjusting the type of binder in the sub-layer 2. By using different type of binders, the fluid pressure of the sub-layer 2 and thereby the permeation can be altered. A rapidly curing binder forms less permeation of the sub-layer 2 through the mesh structure 3.

The fluid pressure may also be controlled by adjusting the moisture content of the sub-layer. The higher moisture content of the sub-layer, the more steam is formed when applying heat and pressure, thereby increasing the fluid pressure, and consequently, permeation of the sub-layer 2 through the mesh structure 3. Contrary, by decreasing the moisture content of the sub-layer 2 before pressing, for example, by drying the sub-layer 2, the less steam is formed during pressing.

Permeation of the sub-layer 2 through the mesh structure 3 may also be controlled by including fillers in the sub-layer. The fillers reduce permeation of the sub-layer by reducing the flowing of the binder. Some fillers, such as wood particles and other organic fillers, absorb the binder to some extent such that the remaining binder that is free to permeate through the mesh structure 3 is reduced. The fluid pressure is thereby also reduced.

Permeation of the sub-layer 2 through the mesh structure 3 may also be controlled by adjusting the thickness of the sub-layer 2, for example, by adjusting the amount of sub-layer applied. If the sub-layer 2 is applied as a powder, the amount of powder applied can be adjusted in order to achieve the desired permeation of the sub-layer 2 through the mesh structure 3. The thicker sub-layer, i.e. the larger amount of sub-layer applied, the more the sub-layer 2 permeates through the mesh structure 3.

Permeation of the sub-layer 2 through the mesh structure 3 may also be controlled by the size of the meshes 5 of the mesh structure 3. By larger mesh size, the sub-layer 2 permeates easily through the mesh structure 3. Controlling permeation of the sub-layer 2 through the mesh structure 3 may be performed by controlling the mesh size of the mesh structure 3.

By adjusting and controlling these parameters, permeation of the sub-layer 2 through the mesh structure 3 can be controlled such that a desired look of the building panel or surface element is obtained. For example, by controlling the permeation of the sub-layer 2, the degree of encapsulating and/or impregnation of the mesh structure 5 by the sub-layer 2 can be controlled.

The mesh structure 3 may be fixed to the sub-layer 2 by the sub-layer 2 at least partly encapsulating the mesh structure 3. This is shown in more detail in FIG. 2B.

Alternatively, or as a complement, the mesh structure 3 may be fixed to the sub-layer 2 by the material forming the mesh structure 3 having a certain surface roughness. The surface roughness of the material of the mesh structure 3 may exceed Ra 6.3. The sub-layer 2 may grip into unevenness of the mesh structure 3.

Figure 2A:
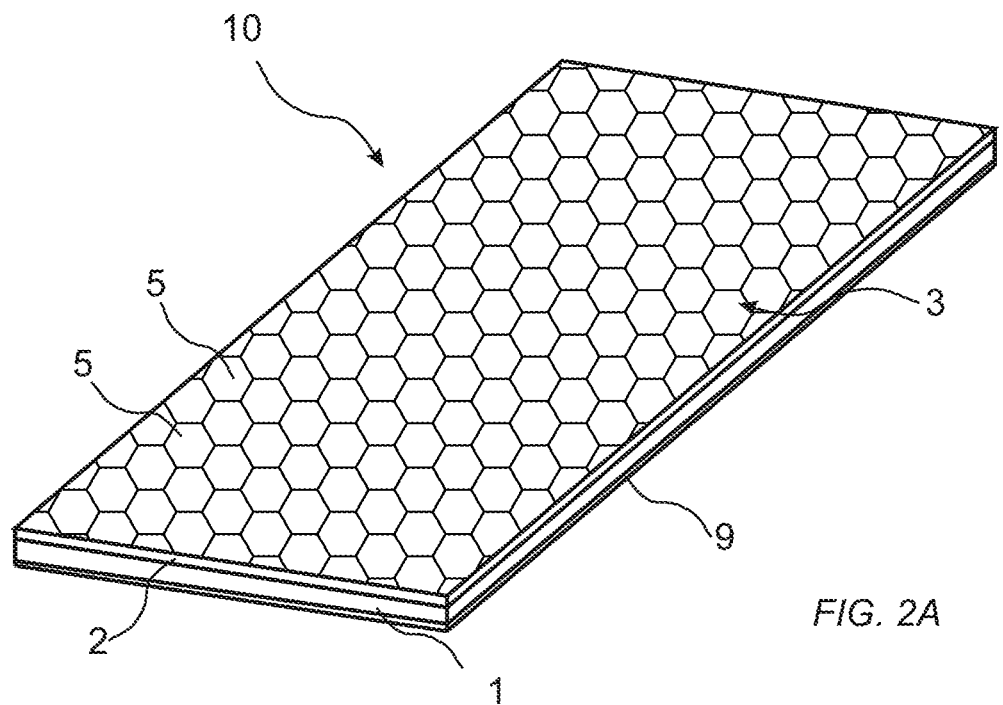
FIG. 2A illustrates an embodiment of a building panel.

FIG. 2A shows an exemplary building panel 10 produced according to the method described with reference to FIGS. 1A-B. The building panel 10 may be a furniture component, a floor panel, a ceiling panel, a wall panel, a door panel, a worktop, skirting boards, mouldings, edging profiles, etc. The substrate 1 on which the sub-layer 2 is applied may be a board, for example, a wood-based board. The wood-based board may be a wood fibre based board such as MDF, HDF, particleboard, or a plywood board. In other embodiments, the substrate 1 may be a Wood Plastic Composite (WPC). The substrate 1 may be a mineral composite board. The substrate 1 may be a fibre cement board. The substrate 1 may be magnesium oxide cement board. The substrate 1 may be a ceramic board. The substrate 1 may be a plastic board such as a thermoplastic board. In another embodiment, the substrate 1 may be a carrier such as sheet of paper or nonwoven. The substrate 1 may be a thermoplastic foil, such as a polyurethane (PU) or polyvinyl chloride (PVC) foil.

The building panel 10 may also be provided with a balancing layer 9 arranged on a second surface of the substrate 1, opposite the first surface 4. The balancing layer 9 may be a powder based balancing layer being applied as a powder. The powder based balancing layer may comprise wood particles such as lignocellulosic and/or cellulosic particles and a binder, preferably a thermosetting binder such as an amino resin. The balancing layer may be a resin impregnated paper, preferably impregnated with a thermosetting binder.

In one embodiment, the balancing layer comprises a sub-layer (not shown) of the type above described and a mesh structure (not shown) of the type described above. In this embodiment, a sub-layer of the above described type is applied also on the second surface of the substrate, and the mesh structure of the above described type is arranged on the sub-layer. The mesh structure of the balancing layer increases friction between the building panel and an underlying surface when the building panel is arranged on the surface, for example, a sub-floor when the building panel is used as floor panel.

The sub-layer 2 comprises a binder of above described type. Preferably, the binder is a thermosetting binder, more preferably an amino resin. The thermosetting binder is cured. The mesh structure 3 of the above described type is fixed to the sub-layer 2. In the embodiment shown in FIGS. 2A-B, the mesh structure 3 is an expanded metal. The metal may be stainless steel, aluminium, copper, brass, or combinations thereof. In embodiments, the mesh structure 3 is formed of a plastic, preferably, thermoplastic material formed as an expanded metal. At least portions of the mesh structure 3 are visible in FIG. 2A. The average mesh size of the expanded metal may be 1-100 mm, and the average area of the meshes may be 1-10,000 $mm^2$. The mesh structure 3 may have a vapour permeability of at least 100 SI Perm, preferably exceeds 200 SI Perm, and more preferably exceeds 500 SI Perm. The mesh structure 3 shown in FIGS. 2A-B has a substantially uniform mesh shape. In other embodiments, the mesh structure 3 may have a varying mesh shape.

Figure 2B:
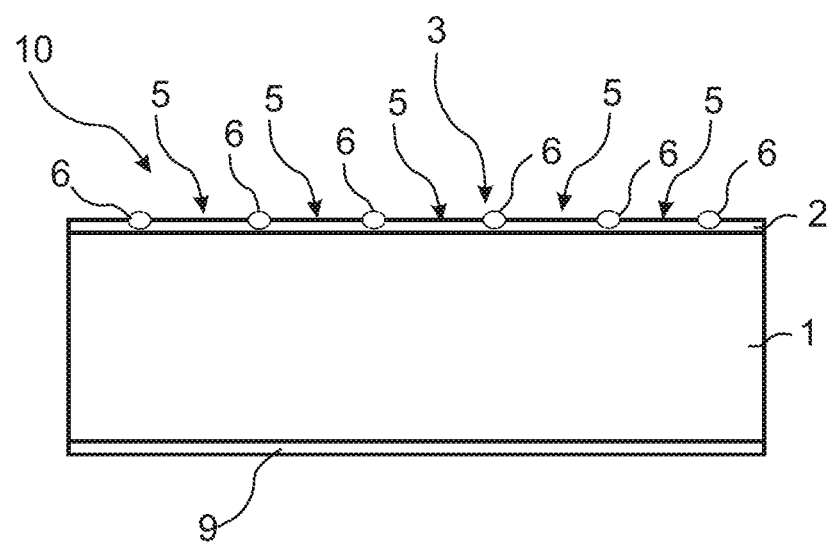
FIG. 2B illustrates the building panel shown in FIG. 2A in cross section.

As shown in more detail in the cross section shown in FIG. 2B, meshes 5 of the mesh structure are at least partly filled with material of sub-layer 2. The sub-layer 2 may have permeated at least partly through the meshes 5 of the mesh structure 3. The material of the sub-layer 2 permeating through the mesh structure 3 may be one or several of the components of the sub-layer 2. For example, the binder of the sub-layer 2 may permeate through the mesh structure. As described above with reference to FIGS. 1A-B, the sub-layer 2 may comprise one component, such as substantially only a binder, or several components, such as fibres, pigments, additives, etc.

As seen in FIG. 2B, at least portions of the mesh structure 3 are at least partly encapsulated by the sub-layer 2. Thereby, the mesh structure 3 is fixed to the sub-layer 2. Preferably, at least portions of the mesh structure 3 are still visible from the top surface of the building panel 10.

In other embodiments, the surface roughness of the material forming the mesh structure 3 provides for the connection between the mesh structure 3 and the sub-layer 2. The surface roughness of the mesh structure 3 may be exceeding Ra 6.3.

Figure 3:
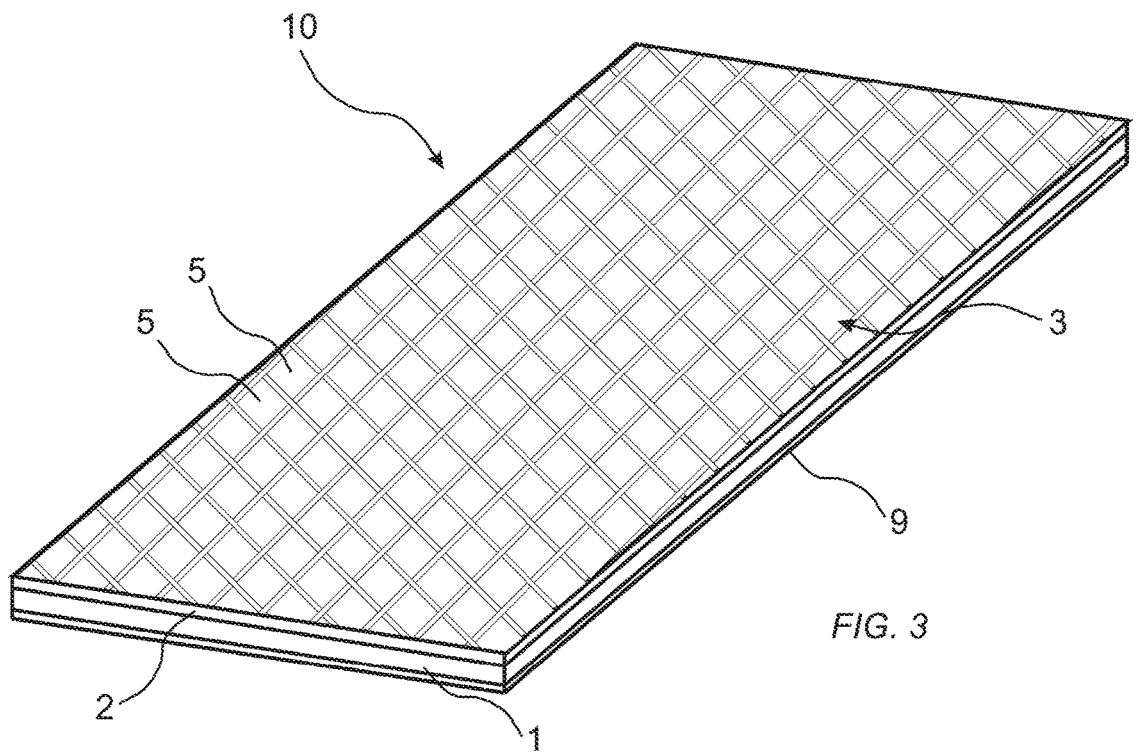
FIG. 3 illustrates an embodiment of a building panel.

FIG. 3 shows an exemplary building panel 10 produced according to the method described with reference to FIGS. 1A-B. The building panel 10 may be a furniture component, a floor panel, a ceiling panel, a wall panel, a door panel, a worktop, skirting boards, mouldings, edging profiles, etc. The substrate 1 on which the sub-layer 2 is applied may be a board, for example, a wood-based board. The wood-based board may be a wood fibre based board such as MDF, HDF, particleboard, or a plywood board. In other embodiments, the substrate 1 may be a Wood Plastic Composite (WPC). The substrate 1 may be a mineral composite board. The substrate 1 may be a fibre cement board. The substrate 1 may be magnesium oxide cement board. The substrate 1 may be a ceramic board. The substrate 1 may be a plastic board such as a thermoplastic board. In another embodiment, the substrate 1 may be a carrier such as sheet of paper or non-woven, or a conveyor. The substrate 1 may be a thermoplastic foil, such as a polyurethane (PU) or polyvinyl chloride (PVC) foil.

The building panel 10 may also be provided with a balancing layer 9 arranged on a second surface of the substrate 1, opposite the first surface 4. The balancing layer 9 may be a powder based balancing layer being applied as a powder. The powder based balancing layer may comprise wood particles such as lignocellulosic and/or cellulosic particles and a binder, preferably a thermosetting binder such as an amino resin. The balancing layer may be a resin impregnated paper, preferably impregnated with a thermosetting binder.

The sub-layer 2 comprises a binder of above described type. Preferably, the binder is a thermosetting binder, more preferably an amino resin. The thermosetting binder is cured. The mesh structure 3 of the above described type is fixed to the sub-layer 2. In the embodiment shown in FIG. 3, the mesh structure 3 is a wire netting. The wire netting may be a metal wire netting. The metal may be stainless steel, aluminium, copper, brass, or combinations thereof. In other embodiments, the wire netting is formed of a plastic material, preferably, thermoplastic material. At least portions of the mesh structure 3 are visible in the top surface of the building panel 10 as shown in FIG. 3. The average mesh size of the wire netting may be 1-100 mm. The mesh structure 3 may have a vapour permeability of at least 100 SI Perm, preferably exceeds 200 SI Perm, and more preferably exceeds 500 SI Perm. The mesh structure 3 shown in FIGS. 2A-B has a substantially uniform mesh shape. In other embodiments, the mesh structure 3 may have a varying mesh shape.

The meshes 5 of the mesh structure 3 are at least partly filled with material from the sub-layer 2. The sub-layer 2 may have permeated at least partly through the meshes 5 of the mesh structure 3. The material of the sub-layer 2 permeating through the mesh structure 3 may be one or several of the components of the sub-layer 2. For example, the binder of the sub-layer 2 may permeate through the mesh structure 3. As described above with reference to FIGS. 1A-B, the sub-layer may comprise one component, such as substantially only a binder, or several components, such as fibres, pigments, additives, etc.

The mesh structure 3 is fixed to the sub-layer 2 by at least portions of the mesh structure are at least partly encapsulated by the sub-layer 2. As an alternative or complement, the surface roughness of the material forming the mesh structure 3 provides for the connection between the mesh structure 3 and the sub-layer 2. The surface roughness of the mesh structure 3 may be exceeding Ra 6.3. Preferably, at least portions of the mesh structure 3 are still visible from the top surface of the building panel 10.

A protective layer (not shown) of the type described above with reference to FIGS. 1A-C may be applied on the mesh structure 3.

Figure 4:
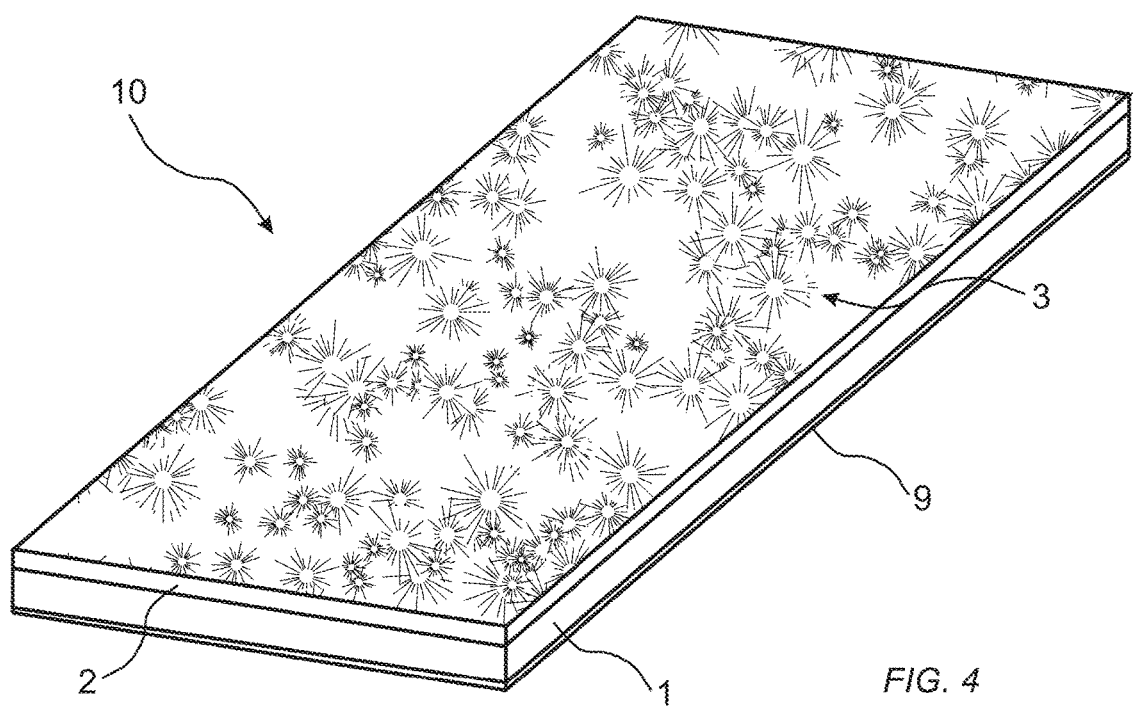
FIG. 4 illustrates an embodiment of a building panel.

FIG. 4 shows an exemplary building panel 10 produced according to the method described with reference to FIGS. 1A-B, wherein the mesh structure 3 comprises a textile. In this embodiment, the textile is a printed fabric. The building panel 10 may be a furniture component, a floor panel, a ceiling panel, a wall panel, a door panel, a worktop, skirting boards, mouldings, edging profiles, etc. The substrate 1 on which the sub-layer 2 is applied may be a board, for example, a wood-based board. The wood-based board may be a wood fibre based board such as MDF, HDF, particleboard, or a plywood board. In other embodiments, the substrate may be a Wood Plastic Composite (WPC). The substrate 1 may be a mineral composite board. The substrate 1 may be a fibre cement board. The substrate 1 may be magnesium oxide cement board. The substrate may be a ceramic board. The substrate 1 may be a plastic board such as a thermoplastic board. The substrate 1 may comprise a thermoplastic foil such as a polyurethane (PU) or polyvinyl chloride (PVC) foil.

The building panel 10 may also be provided with a balancing layer 9 arranged on a second surface of the substrate 1, opposite the first surface 4. The balancing layer 9 may be a powder based balancing layer being applied as a powder. The powder based balancing layer may comprise wood particles such as lignocellulosic and/or cellulosic particles and a binder, preferably a thermosetting binder such as an amino resin. The balancing layer may be a resin impregnated paper, preferably impregnated with a thermosetting binder.

The sub-layer 2 comprises a binder of above described type. The binder is a thermosetting binder, more preferably an amino resin, of the type described above with reference to FIG. 1-*c*. The thermosetting binder is cured. The mesh structure 3 of the above described type is fixed to the sub-layer. The binder may be a thermosetting binder as described with reference to FIG. 1-*c*.

In the embodiment shown in FIG. 4, the mesh structure 3 comprises a textile. The textile may be woven or non-woven. The textile may comprise natural or synthetic fibres. The threads of the textile form a mesh structure 3. The average mesh size of the textile may be 0.1-10 mm, preferably 0.5-5 mm. The average area of the meshes of the textile may be 0.01-100 mm2, preferably 0.25-25 mm2. In a non-woven, spaces between the fibres form meshes 5 of a mesh structure 3. Preferably, the textile has a vapour permeability exceeding 100 SI Perm, preferably exceeds 200 SI Perm, and more preferably exceeds 500 SI Perm.

The textile may be printed, for example, with a decorative design. The print may be a digital print, or may be printed by other means, for example, rotogravure. The print may be printed before the textile is applied on the sub-layer 2. The textile may also be printed, preferably with a digital print, when the textile applied on the sub-layer 2 before pressing. By printing on the textile before pressing, when the textile is arranged on the sub-layer 2, the print may also reach the sub-layer 2, such that the sub-layer 2 also is printed and that the sub-layer 2 does not influence the design of textile in a disadvantageous manner after pressing. As an alternative or complement, the textile may be printed after pressing.

The print of the textile is preferably a digital print. The print may be printed by a Piezo print head. The ink may be an aqueous ink. The ink may be pigment-based or dye-based. The digital print may also be of the BAP type (Binder and Print), for example, as described in WO 2014/017972 and/or in WO 2014/109699.

During pressing, material from the sub-layer 2 has permeated through the mesh structure 3 and at least partly filled meshes 5 or the mesh structure. The mesh structure 3 has been fixed to the sub-layer 2. The material of the sub-layer 2 permeating through the mesh structure 3 may be one or several of the components of the sub-layer 2. For example, the binder of the sub-layer 2 may permeate through the mesh structure. As described above with reference to FIGS. 1A-B, the sub-layer 2 may comprise one component, such as substantially only a binder, or several components, such as fibres, pigments, additives, etc.

The sub-layer 2 may at least partly encapsulate the textile. Preferably, the sub-layer 2 becomes or remains transparent after pressing such that the sub-layer 2 does not affect the design of the textile. The sub-layer 2 reinforces the textile. Thereby, a textile surface may be used for surfaces otherwise not suitable for textile material.

A protective layer (not shown) of the type described above with reference to FIGS. 1A-C may be applied on the mesh structure 3.

In one embodiment, thermosetting binders such as melamine formaldehyde binders are used in the sub-layer 2 when the mesh structure 3 comprises a textile material. A particularly suitable mesh structure 3 is a woven material comprising cotton fibres that will be impregnated by liquid melamine formaldehyde resin during the initial step of pressing and heating when the dry melamine formaldehyde resin is converted from dry to liquid state and will be chemically bonded to the sub-layer 2 when the melamine formaldehyde resin in the sub-layer 2 and in the cotton fibres cures during the final pressing and heating step. Preferable press parameters are a temperature of 150° C.-180° C. and a pressure of 20-60 bars. When the building panel 10 is to be used as a floor panel, it is important that the cotton fibres are sufficiently filled with resins in order to prevent water and dirt to penetrate into the fibres from the surface and especially from the edges where the fibres are cut when a floor panel is produced. It may be that the resins of sub-layer 2 that penetrates into the meshes are not sufficient to provide a sufficient resin content in the cotton fibres that is needed to obtain a water resistant surface. Additional resins may be applied on the textile material prior to pressing, for example, melamine formaldehyde powder. As an alternative, the mesh structure 3 may be impregnated with a thermosetting binder such as a liquid melamine formaldehyde resin and dried prior to pressing.

A very realistic surface structure may be formed if a press matrix of a similar mesh structure is used, especially if the mesh structure 3 comprises a textile material. It is preferred to use a foil or a release paper to provide a basic gloss level or microstructure. According to this embodiment, the upper part of the building panel 10 may prior to pressing comprise a sub-layer, a mesh structure 3 of a first textile material, an aluminium foil and a second textile material. The aluminium foil and the second textile material are removed after pressing. It is also possible to use a flexible press cushion as an alternative to the second textile material such that the structure of the first textile material is partly visible after pressing. Similar technologies may also be used to create an embossed structure on building panels comprising other mesh materials of the type described in this application.

Figure 5:
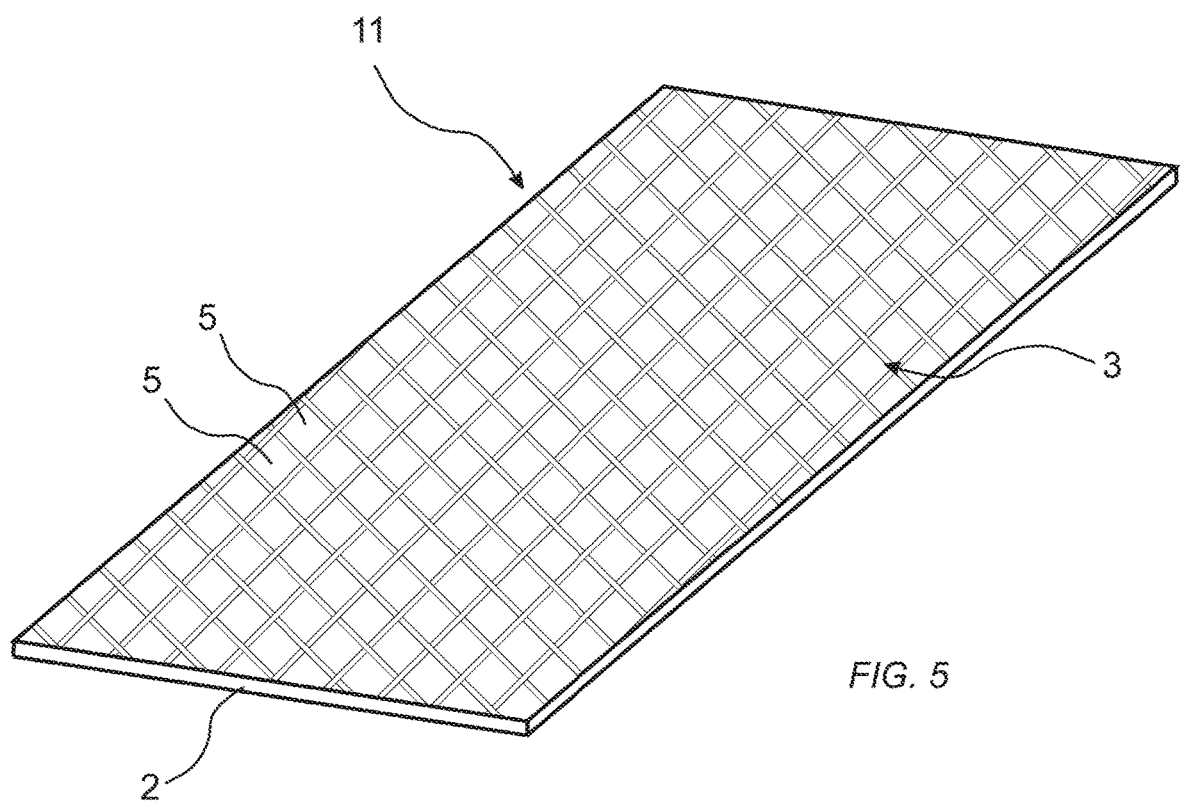
FIG. 5 illustrates an embodiment of a surface element, for example, adapted to form part of a building panel.

FIG. 5 shows an exemplary surface element 11. The surface element 11 is produced as described above with reference to FIGS. 1A-B, wherein the substrate is formed by the conveyor and wherein the sub-layer 2 has been applied directly on a conveyor. A mesh structure 3 of any type described above with reference to FIGS. 1-4 is arranged on the sub-layer 2. In the embodiment shown in FIG. 5, the mesh structure 3 comprises a wire netting of the type described above with reference to FIG. 3. After pressing, the surface element 11 has been removed from the conveyor.

The meshes 5 of the mesh structure 3 are at least partly filled with material from the sub-layer 2. The sub-layer 2 may have permeated at least partly through the meshes 5 of the mesh structure 3. The material of the sub-layer 2 permeating through the mesh structure 3 may be one or several of the components of the sub-layer 2. For example, the binder of the sub-layer 2 may permeate through the mesh structure. As described above with reference to FIGS. 1A-B, the sub-layer 2 may comprise one component, such as substantially only a binder, or several components, such as fibres, pigments, additives, etc.

The mesh structure 3 is fixed to the sub-layer 2 by at least portions of the mesh structure 3 being at least partly encapsulated by the sub-layer 2. As an alternative or complement, the surface roughness of the material forming the mesh structure 3 provides for the connection between the mesh structure 3 and the sub-layer 2. The surface roughness of the mesh structure 3 may be exceeding Ra 6.3. Preferably, at least portions of the mesh structure 3 are still visible from the top surface of the building panel 10.

A protective layer (not shown) of the type described above with reference to FIGS. 1A-C may be applied on the mesh structure 3.

The mesh structure 3 is fixed to the sub-layer 2 such that a surface element 11 is formed. The surface element 11 may be adapted to form part of a building panel 10. The surface layer may be attached to a substrate of the above described type in a subsequent step. The surface element 11 may be used as it is without being adhered to a substrate.

Figure 6:
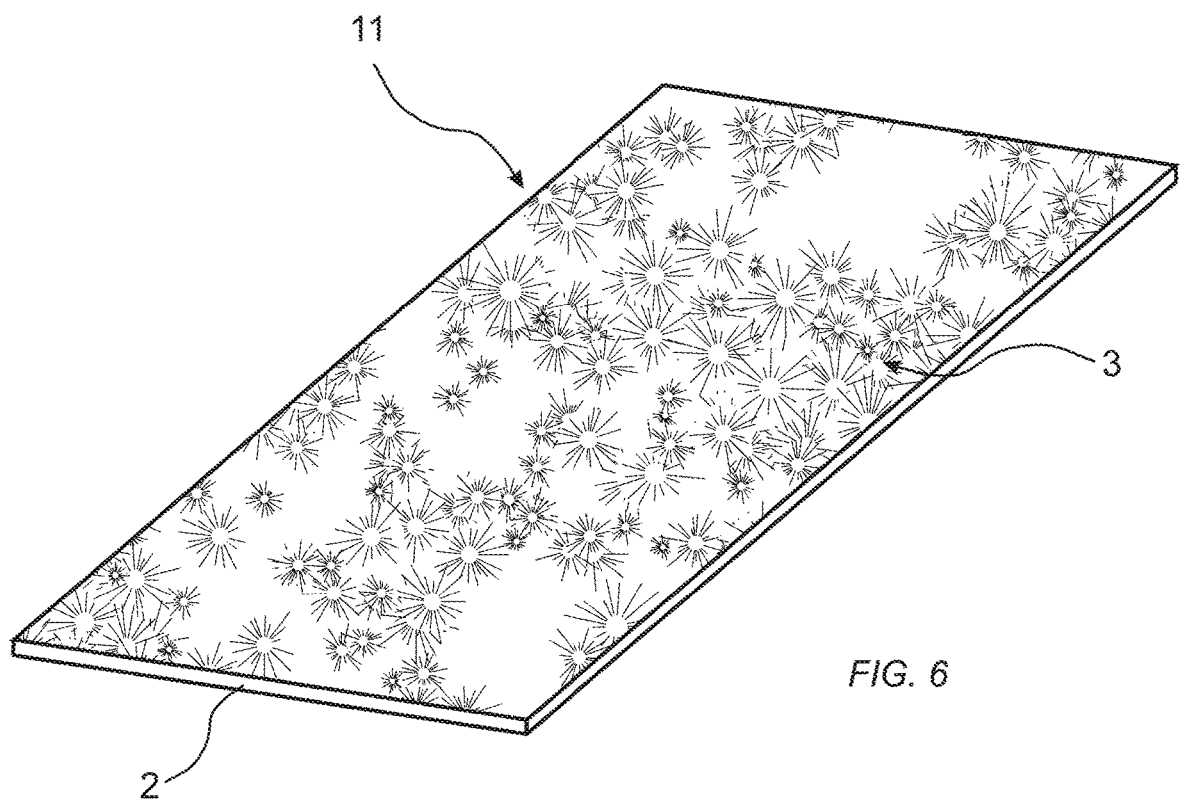
FIG. 6 illustrates an embodiment of a surface element, for example, adapted to form part of a building panel.

FIG. 6 shows an exemplary surface element 11. The surface element 11 is produced as described above with reference to FIGS. 1A-B, wherein the substrate is formed by the conveyor and wherein the sub-layer 2 has been applied directly on a conveyor during production when manufactured as described above with reference to FIGS. 1A-B. After pressing, the surface element 11 is removed from the conveyor.

In the embodiment shown in FIG. 6, the mesh structure 3 comprises a textile of the type described above with reference to FIG. 4. The textile may be woven or non-woven. The textile may comprise natural or synthetic fibres. The threads of the textile form a mesh structure 3. The mesh size of the textile may be 0.1-10 mm, preferably 0.5-5 mm. In a non-woven, spaces between the fibres form meshes 5 of a mesh structure 3. Preferably, the textile has a vapour permeability exceeding 100 SI Perm, preferably exceeds 200 SI Perm, and more preferably exceeds 500 SI Perm.

The textile may be printed, for example, with a decorative design. The print may be a digital print, or may be printed by other means, for example, rotogravure.

The print of the textile is preferably a digital print. The print may be printed by a Piezo print head. The ink may be an aqueous ink. The ink may be pigment-based or dye-based. The digital print may also be of the BAP type (Binder and Print), for example, as described in WO 2014/017972 and/or in WO 2014/109699.

The sub-layer 2 may be of any type as described above with reference to FIGS. 1A-C and FIG. 4. In one embodiment, the sub-layer 2 may comprise a thermoplastic binder. The binder of the sub-layer 2 may comprise polyurethane (PU) or polyvinyl chloride (PVC). The binder may be applied in powder form. The sub-layer 2 may comprise a thermoplastic foil, such as polyurethane (PU) foil or polyvinyl chloride foil (PVC).

A protective layer (not shown) may be provided on the mesh structure 3. The protective layer may be arranged on the mesh structure 3 prior to pressing. The protective layer of the type described above with reference to FIGS. 1A-C may be applied on the mesh structure 3. In one embodiment, the protective layer comprises a thermoplastic foil, such as polyurethane (PU) foil or polyvinyl chloride foil (PVC).

During pressing, the sub-layer 2 has permeated through the mesh structure 3 and at least partly filled meshes 5 or the mesh structure. The mesh structure 3 has been fixed to the sub-layer 2. The material of the sub-layer 2 permeating through the mesh structure 3 may be one or several of the components of the sub-layer 2. For example, the binder of the sub-layer 2 may permeate through the mesh structure. As described above with reference to FIGS. 1A-B, the sub-layer 2 may comprise one component, such as substantially only a binder, or several components, such as fibres, pigments, additives, etc.

The sub-layer 2 may at least partly encapsulate the textile. Preferably, the sub-layer 2 becomes or remains transparent after pressing such that the sub-layer 2 does not affect the design of the textile. The sub-layer 2 reinforces the textile. Thereby, a textile surface may be used for surfaces otherwise not suitable for textile material.

The surface element 11 shown in FIGS. 5 and 6 may be used as it is, or may be adhered to a substrate in a subsequent step, for example, for forming a building panel of the above described type.

It is also contemplated that a protective layer (not shown) may be applied on the mesh structure 3 in all embodiments. The protective layer is preferably transparent. The protective layer may be a coating such as one or several lacquer layers. The coating may be an acrylate or methacrylate coating such as polyurethane coating. The coating may comprise wear and/or scratch resistant particles. The protective layer may be an overlay paper comprising wear resistant particles. The protective layer may be a powder overlay, as described in WO 2011/129755, comprising processed wood fibres, a binder and wear resistant particles applied as mix on the mesh structure. If the protective layer comprises or is an overlay paper or a powder overlay, the protective layer is preferably applied before the step of applying heat and pressure. Thereby, the protective layer is cured and attached to the mesh structure 5 and the sub-layer 2 in the same step as attaching the mesh structure 5 to the sub-layer and to the substrate.

A thermoplastic protective layer may also be applied on the mesh structure 3 prior or after pressing. The protective layer may be thermoplastic foil such as PU or PVC foil.

It is further contemplated that the sub-layer of the above described type may in some embodiments be applied on the mesh structure when forming the building panel or surface element as a complement or alternative to applying the sub-layer on the substrate as described above with reference to FIGS. 1A-B.

All embodiments of the building panel 10 may be provided with a mechanical locking system for joining with an adjacent building panel such as an adjacent floor or wall panel. If the building panel 10 is a furniture component for a drawer, shelf or other furniture, the furniture may be provided with a mechanical locking system for joining with another part of the drawer, shelf or furniture component.

Figure 7:
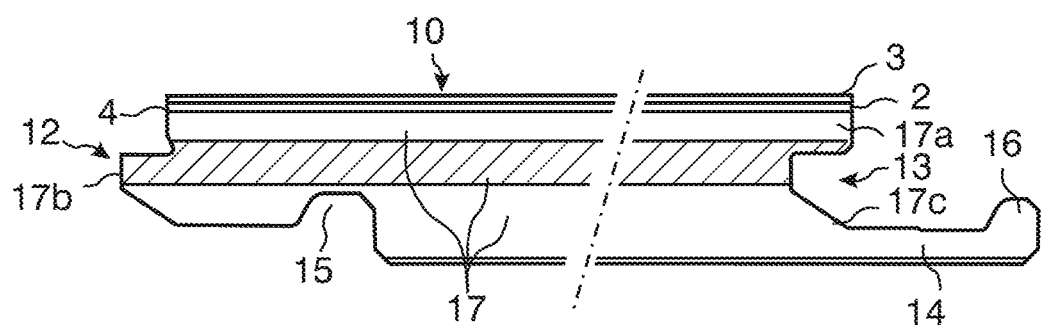
FIG. 7 illustrates a cross-section of an embodiment of a building panel.

FIG. 7 shows an embodiment of a building panel 10 such as a floor panel having such a mechanical locking system. The mechanical locking system may comprise a tongue 12 at a first edge and a tongue groove 13 at a second edge opposite the first edge for vertical locking. The mechanical locking system further comprises a locking strip 14 provided with a locking element 16 at the second edge adapted to cooperate with a locking grove 15 at the first edge for horizontal locking. A mesh structure 3 of the above described type is applied on a sub-layer 2 of the above described type. The building panel further comprises a core 17. It is preferable that the sub-layer 2 and the mesh structure 3 have a rather similar moisture movement when relative humidity (RH) varies from 20-80%. Some mesh materials such as metal are very moisture stable while wood based materials such as HDF have a high moisture movement and this may cause warping and/or delamination. Such problems may be eliminated or at least reduced with a core material that is adapted to a specific mesh material. A core with low swelling and low moisture movement may comprise an upper layer 17a and lower layer 17c each comprising thermoplastic materials and wood fibres. The upper and lower layers 17a, 17c may be produced by a dry blend of such materials. This makes it possible to form a first surface 4 that comprises open wood fibres allowing lamination to a sub-layer 2 comprising thermosetting resins. An intermediate layer 17b of the core 17 may comprise thermoplastic material mixed with mineral particles such as, for example, limestone. The composition, thickness and position of the core layers 17a, 17b, 17c may be adapted to meet the material properties of the sub-layer 2 and the mesh structure in order to form a stable and flat building panel 10. The intermediate layer 17b comprising thermoplastic particles and mineral filler may be softer and more flexible than the upper layer 17a. The intermediate layer 17b may be located such that it forms an upper part of the tongue 12 and the tongue groove 13. Such joint geometry may be used to seal against water penetration in all embodiments of the invention.

The joint geometry may also be used in other application with any type of surface layer, i.e. without a mesh structure, to seal against water penetration. A very watertight joint may be formed especially if the tongue and the tongue groove are connected with a vertical pretension that causes a small compression of the upper part of the tongue and the tongue groove.

The mesh structure may also be adapted to the moisture movement of the substrate by choosing a mesh structure having a flexibility, which allows the mesh structure to expand and/or be compressed together with the movements of the substrate.

It is contemplated that there are numerous modifications of the embodiments described herein, which are still within the scope of the invention as defined by the appended claims.

EXAMPLES

Example 1

625 g/m2 of a powder mixture, comprising 30.41 wt % wood fibres, 8.8 wt % aluminium oxide (Alodur ZWSK 180-ST), 52.5 wt % melamine formaldehyde resin (Kauramin 773) and 8.29 wt % of pigments was scattered on a 10.0 mm HDF board for forming a sub-layer. A textile fabric was positioned on the sub-layer prior to pressing the assembly in a short cycle press for 35 seconds at 40 kg/cm2 with a press plate temperature of 140° C. During pressing, the sub-layer has permeated through the fabric. The resulting product was a building panel with a surface layer of textile being impregnated by the sub-layer during pressing.

Example 2

600 g/m2 of a powder mixture, comprising 33 wt % wood fibres, 10 wt % aluminium oxide (Alodur ZWSK 180-ST), 47 wt % melamine formaldehyde resin (Kauramin 773) and 10 wt % BaSo4 (BB 30 EX) was scattered on a 10.0 mm HDF board for forming a sub-layer. A denim fabric was applied on the sub-layer. An overlay comprising a resin impregnated paper (Liquilay, AC3-N) was applied on the denim fabric. Two backing papers of 140 g/m2 each were applied to the rear side of the HDF board. The assembly was pressed in a short cycle press during 50 seconds at 40 bar with a press plate temperature of 160° C. During the pressing, the sub-layer has permeated through the fabric. The resulting product was a building panel with a surface layer of a denim fabric being impregnated by the sub-layer during pressing.

Example 3

625 g/m2 of a powder mixture, comprising 30.41 wt % wood fibres, 8.8 wt % aluminium oxide (Alodur ZWSK 180-ST), 52.5 wt % melamine formaldehyde resin (Kauramin 773) and 8.29 wt % of pigments was scattered on a 10.0 mm HDF board for forming a sub-layer. An expanded metal sheet of aluminium, having an aperture dimension long way of 5.9 mm, an aperture dimension short way of 3.4 mm and a width of 0.8 mm was positioned on the sub-layer prior to pressing the assembly in a short cycle press for 35 seconds at 40 kg/cm2 with a press plate temperature of 140° C. During pressing, the sub-layer has at least partly filled the meshes of the expanded metal sheet. The resulting product was a building panel with a surface layer of expanded metal being at least partly encapsulated by the sub-layer after pressing.

Example 4

625 g/m2 of a powder mixture, comprising 30.41 wt % wood fibres, 8.8 wt % aluminium oxide (Alodur ZWSK 180-ST), 52.5 wt % melamine formaldehyde resin (Kauramin 773) and 8.29 wt % of pigments was scattered on a 10.0 mm HDF board for forming a sub-layer. A perforated aluminium foil was applied on the sub-layer prior to pressing the assembly in a short cycle press for 35 seconds at 40 kg/cm2 with a press plate temperature of 140° C. During pressing, the sub-layer has permeated through the openings of the perforated foil. The resulting product was a building panel with a surface layer of a perforated aluminium foil being at least partly encapsulated by the sub-layer after pressing.

Example 5

A digitally printed textile material was arranged on a thermoplastic polyurethane foil having a thickness of 0.05 mm for forming a sub-layer. A protective layer in form of a thermoplastic polyurethane foil having a thickness of 0.05 m was arranged on the textile material. The sub-layer, the textile material, and the protective layer were pressed together such that material from the sub-layer permeates into the meshes of the textile material. A decorative surface element is formed, which may be used as it is, or may be adhered to a substrate in a subsequent step.

EMBODIMENTS

1. A method of forming a building panel (10) or a surface element (11), comprising
   providing a substrate (1),
   applying a sub-layer (2) on a first surface (4) of the substrate (1),
   applying a mesh structure (3) on the sub-layer (2), wherein a vapour permeability of the mesh structure (3) exceeds 100 SI Perm, and
   applying heat and pressure to said mesh structure (3) such that the sub-layer (2) at least partially fills meshes (5) of the said mesh structure (3).

2. The method according to claim 1, wherein the mesh structure (3) has a substantially uniform vapour permeability in a plane parallel to the first surface (4) of the substrate (1).

3. The method according to embodiment 1 or 2, wherein the vapour permeability of the mesh structure (3) exceeds 200 SI Perm, preferably exceeds 500 SI Perm.

4. The method according to any one of embodiments 1-3, wherein applying heat and pressure comprises curing the sub-layer (2) and thereby fixing the mesh structure (3) to the sub-layer (2).

5. The method according to any one of embodiments 1-4, wherein the mesh structure (3) is at least partially visible after heat and pressure have been applied.

6. The method according to any one of embodiments 1-5, wherein the sub-layer (2) at least partially encapsulates the mesh structure (3).

7. The method according to any one of embodiments 1-6, wherein a material forming the mesh structure (3) facing the sub-layer (2) has a surface roughness exceeding Ra 6.3.

8. The method according to any one of embodiments 1-7, wherein the sub-layer (2) comprises a thermosetting binder.

9. The method according to any one of embodiments 1-8, wherein the mesh structure (3) is formed of a metal material.

10. The method according to any one of embodiments 1-8, wherein the mesh structure (3) is formed of a plastic material.

11. The method according to any one of embodiments 1-10, wherein the mesh structure (3) is formed of a perforated foil.

12. The method according to any one of embodiments 1-8, wherein the mesh structure (3) is formed of a textile material.

13. The method according to embodiment 12, wherein the textile material comprises weaved cotton fibres.

14. The method according to embodiment 12 or 13, wherein a mesh size (MS) and mesh width (MW) of the textile material exceeds 0.1 mm.

15. The method according to any one of embodiments 12-14, wherein the textile material is bonded to the sub-layer (2) by a cured thermosetting binder, preferably melamine formaldehyde resin, when applying heat and pressure.

16. The method according to any one of embodiments 12-15, wherein the textile material is chemically impregnated by the sub-layer (2) by a cured thermosetting binder, preferably melamine formaldehyde resin, when applying heat and pressure.

17. The method according to any one of embodiments 12-16, wherein a melamine formaldehyde resin powder is applied on the textile material prior to applying heat and pressure.

18. The method according to any one of embodiments 12-17, wherein the textile material is impregnated with a thermosetting binder, preferably melamine formaldehyde resin, prior to applying heat and pressure.

19. The method according to any one of embodiments 1-18, wherein the substrate (1) comprises a wood-based board.

20. The method according to any one embodiments 1-19, wherein a temperature of 150° C.-180° C. and a pressure of 20-60 bar is applied on the mesh structure (3) when applying heat and pressure.

21. A building panel (10), comprising
a substrate (1),
a sub-layer (2) arranged on a first surface (4) of the substrate (1), and
a mesh structure (3) arranged on the sub-layer (2), wherein meshes (5) of the mesh structure (3) are at least partly filled with material from the sub-layer (2),
wherein a vapour permeability of the mesh structure (3) exceeds 100 SI Perm.

22. The building panel according to embodiment 21, wherein the mesh structure (3) has a substantially uniform vapour permeability in a plane parallel to the first surface (4) of the substrate (1).

23. The building panel according to embodiment 21 or 22, wherein a vapour permeability of the mesh structure (3) 200 SI Perm, preferably exceeds 500 SI Perm.

24. The building panel according to any one of embodiments 21-23, wherein the mesh structure (3) is at least partially visible.

25. The building panel according to any one of embodiments 21-24, wherein the sub-layer (2) at least partially encapsulates the mesh structure (3).

26. The building panel according to any one of embodiments 21-25, wherein a material forming the mesh structure (3) facing the sub-layer (2) has a surface roughness exceeding Ra 6.3.

27. The building panel according to any one of embodiments 21-26, wherein the sub-layer (2) comprises a thermosetting binder.

28. The building panel according to any one of embodiments 21-27, wherein the mesh structure (3) is formed of a metal material.

29. The building panel according to any one of embodiments 21-27, wherein the mesh structure (3) is formed of a plastic material.

30. The building panel according to any one of embodiments 21-29, wherein the mesh structure (3) is formed of a perforated foil.

31. The building panel according to any one of embodiments 21-27, wherein the mesh structure (3) is formed of a textile material.

32. The building panel according to any one of embodiments 21-31, wherein the substrate (1) comprises a wood-based board.

33. The building panel according to any one of embodiments 21-32, wherein the sub-layer (2) comprises wood fibres and thermosetting resins, and wherein the substrate (1) comprises a wood-based board comprising several layers (17a, 17b, 17c), wherein at least a first layer (17a, 17c) comprises thermoplastic material mixed with wood fibres and wherein at least a second layer (17b) comprises thermoplastic material mixed with mineral particles.

34. The building panel according to embodiment 33, comprising a locking system comprising a tongue (12) at a first edge and a tongue groove (13) at a second edge opposite the first edge, wherein an upper part of the tongue (12) and an upper part of the tongue groove (13) comprise the mineral particles.

35. A surface element (11), comprising
a sub-layer (2), and
a mesh structure (3) arranged on the sub-layer (2), wherein meshes (5) of the mesh structure (3) are at least partly filled with material from the sub-layer (2),
wherein a vapour permeability of the mesh structure (3) exceeds 100 SI Perm.

36. The surface element according to embodiment 35, wherein the mesh structure (3) is formed of a textile material.

37. The surface element according to embodiment 35-36, further comprising a protective layer arranged on the mesh structure (3).

38. The surface element according to any one of embodiment 35-37, wherein the sub-layer (2) comprises a thermoplastic foil.

39. The surface layer according to embodiment 37 or 38, wherein the protective layer comprises a thermoplastic foil.

The invention claimed is:

1. A method of forming a building panel or a surface element, comprising
providing a substrate,
applying a sub-layer on a first surface of the substrate,
then applying a mesh structure on the sub-layer, which has been applied on the first surface of the substrate, wherein a vapour permeability of the mesh structure exceeds 100 SI Perm, and
applying heat and pressure to said mesh structure with a pressing process, wherein the pressing process comprises a press plate that presses the mesh structure, sublayer and substrate together such that portions of the sub-layer permeate through meshes of the said mesh structure.

2. The method according to claim 1, wherein the mesh structure has a substantially uniform vapour permeability in a plane parallel to the first surface of the substrate.

3. The method according to claim 1, wherein the vapour permeability of the mesh structure exceeds 200 SI Perm.

4. The method according to claim 1, wherein applying heat and pressure comprises curing the sub-layer and thereby fixing the mesh structure to the sub-layer.

5. The method according to claim 1, wherein the mesh structure is at least partially visible after heat and pressure have been applied.

6. The method according to claim 1, wherein the sub-layer at least partially encapsulates the mesh structure.

7. The method according to claim 1, wherein a material forming the mesh structure facing the sub-layer has a surface roughness exceeding Ra 6.3.

8. The method according to claim 1, wherein the sub-layer comprises a thermosetting binder.

9. The method according to claim 1, wherein the mesh structure is formed of a metal material.

10. The method according to claim 1, wherein the mesh structure is formed of a plastic material.

11. The method according to claim 1, wherein the mesh structure is formed of a perforated foil.

12. The method according to claim 1, wherein the mesh structure is formed of a textile material.

13. The method according to claim 12, wherein the textile material comprises weaved cotton fibres.

14. The method according to claim 12, wherein a mesh size and mesh width of the textile material exceeds 0.1 mm.

15. The method according to claim 12, wherein the textile material is bonded to the sub-layer by a cured thermosetting binder when applying heat and pressure.

16. The method according to claim 12, wherein the textile material is chemically impregnated by the sub-layer by a cured thermosetting binder when applying heat and pressure.

17. The method according to claim 12, wherein a melamine formaldehyde resin powder is applied on the textile material prior to applying heat and pressure.

18. The method according to claim 12, wherein the textile material is impregnated with a thermosetting binder prior to applying heat and pressure.

19. The method according to claim 1, wherein the substrate comprises a wood-based board.

20. The method according to claim 1, wherein a temperature of 150° C.-180° C. and a pressure of 20-60 bar is applied on the mesh structure when applying heat and pressure.

21. The method according to claim 1, wherein the sublayer is applied in liquid form.

22. A method of forming a building panel or a surface element, comprising providing a substrate, applying a sub-layer on a first surface of the substrate, then applying a mesh structure on the sub-layer, which has been applied on the first surface of the substrate, wherein a vapour permeability of the mesh structure exceeds 100 SI Perm, and applying heat and pressure to said mesh structure with a pressing process, wherein the pressing process comprises a press plate that presses the mesh structure, sublayer and substrate together such that portions of the sub-layer permeate completely through meshes of the said mesh structure.

23. The method according to claim 1, wherein the mesh structure is bonded to the sub-layer by a cured thermosetting binder when applying heat and pressure.

24. The method according to claim 22, wherein the mesh structure is bonded to the sub-layer by a cured thermosetting binder when applying heat and pressure.

25. The method of claim 1, wherein the press plate is at a temperature of 140° C. to 160° C.

26. The method of claim 22, wherein the press plate is at a temperature of 140° C. to 160° C.

* * * * *